(12) United States Patent
Williams et al.

(10) Patent No.: US 11,599,005 B2
(45) Date of Patent: *Mar. 7, 2023

(54) OPTICAL WAVEGUIDE MODULATOR

(71) Applicant: Nokia Solutions and Networks Oy, Espoo (FI)

(72) Inventors: Christopher Williams, Montreal (CA); Mostafa Ahmed, Urbana, IL (US); Alexander Rylyakov, Staten Island, NY (US); Richard C. Younce, Naperville, IL (US); Yang Liu, Elmhurst, NY (US); Ran Ding, New York, NY (US); Abdelrahman Ahmed, Brooklyn, NY (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,954

(22) Filed: Aug. 9, 2021

(65) Prior Publication Data

US 2021/0373409 A1 Dec. 2, 2021

Related U.S. Application Data

(63) Continuation of application No. 16/734,539, filed on Jan. 6, 2020, now Pat. No. 11,086,188, which is a continuation of application No. 16/202,818, filed on Nov. 28, 2018, now Pat. No. 10,558,104, which is a continuation of application No. 15/602,657, filed on May 23, 2017, now Pat. No. 10,168,596.

(51) Int. Cl.
*G02F 1/225* (2006.01)
*G02F 1/21* (2006.01)

(52) U.S. Cl.
CPC .......... *G02F 1/2255* (2013.01); *G02F 1/2257* (2013.01); *G02F 1/212* (2021.01); *G02F 2201/122* (2013.01)

(58) Field of Classification Search
CPC . G02F 1/2255; G02F 1/2257; G02F 2001/212
See application file for complete search history.

(56) References Cited

U.S. PATENT DOCUMENTS

| 9,229,250 B2* | 1/2016 | Minoia | H03K 19/018528 |
| 9,507,237 B2* | 11/2016 | Denoyer | H04B 10/556 |
| 10,168,596 B2* | 1/2019 | Williams | G02F 1/2257 |
| 2015/0295650 A1* | 10/2015 | Lee | G02F 1/225 398/115 |

* cited by examiner

*Primary Examiner* — Omar R Rojas
(74) *Attorney, Agent, or Firm* — Stratford Group Ltd.

(57) ABSTRACT

A multi-section optical modulator and related method are disclosed wherein two waveguide arms traverse a plurality of successive modulating sections. A differential drive signal is applied separately to each waveguide arm of each modulating sections in synchronism with the transmission of light along the waveguide arms, effecting a dual differential driving of each section. By suitably selecting the number of modulating sections and the section length, a high modulation bandwidth and a high modulation efficiency may be achieved simultaneously for a given peak-to-peak voltage swing of the drive signal.

21 Claims, 17 Drawing Sheets

OPTICAL WAVEGUIDE MODULATOR

CROSS-REFERENCE TO RELATED APPLICATIONS

This application is a continuation of U.S. patent application Ser. No. 16/734,539, filed Jan. 6, 2020, now allowed, which is a continuation of U.S. patent application Ser. No. 16/202,818, filed Nov. 28, 2018, now U.S. Pat. No. 10,558,104, which is a continuation of U.S. patent application Ser. No. 15/602,657, filed May 23, 2017, now U.S. Pat. No. 10,168,596, which are hereby incorporated by reference in their entireties.

TECHNICAL FIELD

The present invention generally relates to optical modulators, and more particularly relates to a broad-band optical waveguide modulator with segmented electrodes configured for dual-differential driving.

BACKGROUND

Broad-band optical communications typically require high-speed electro-optical modulators (EOM) to modulate light at a desired data rate. One common type of a broad-band EOM is a Mach-Zehnder modulator (MZM) that uses a waveguide Mach-Zehnder (MZ) interferometric structure with RF-driven optical phase modulators in each arm. The waveguide arms of the MZM are typically formed in an electro-optic material, for example a suitable semiconductor or electro-optic material such as $LiNbO_3$, where optical properties of the waveguide may be controlled by applying a voltage. Such a waveguide modulator may be implemented in an opto-electronic chip as a photonic integrated circuit (PIC). A silicon photonics (SiP) platform based on Silicon on Insulator (SOI) technology may be particularly attractive for implementing broad-band modulators as it enables a natural integration with CMOS-based high-speed electronic drivers.

One common technique to high-speed modulation of propagating light, in particular at modulation rates on the order of 10-20 Gigabit per second (Gb/s) and higher, is the travelling wave approach, when the modulating electrical RF signals are applied to properly terminated electrical transmission lines that are electro-optically coupled and velocity-matched to the optical waveguides of the EOM. FIG. 1 schematically illustrates an example broad-band EOM in the form of an MZM 10 with two waveguide arms 11, 12 coupled to two electrical transmission lines 30 of length L, each formed by an inner electrode 22 and an outer electrode 21 with a transmission line termination 25. In the SiP platform, the electrodes 21, 22 may be overlaying p/n junctions formed across the waveguide arms that may either inject carriers (forward bias) or deplete carriers (reverse bias) in the waveguide core to modulate the refractive index of the waveguide by means of the carrier plasma dispersion effect. A common approach is to have the inner electrodes 22 connected to the ground, and to use a differential RF signal to drive the outer electrodes 21, so as to effectively double the phase modulation amplitude at the output combiner for a given peak-to-peak (PP) drive voltage Vpp applied to each electrode. In one common implementation, the transmission lines 30 modulate reverse-biased PN junctions formed along the length of the line, which modulate the light that is travelling in the waveguide arms 11, 12 at the same velocity as the RF signals propagating in the transmission lines 30.

Such traveling-wave modulators however present a design trade-off: increasing the length of the transmission lines in the EOMs improves the optical eye opening at the output of the modulator, but reduce the modulator bandwidth and increases the size of the modulator. The optical eye opening at the output of the modulator may be expressed in terms of the optical modulation amplitude (OMA), which may be defined as the difference in optical power between the "ON" and "OFF" levels for the On-Off-Keyed (OOK) modulation. Thus, designing EOMs having a sufficiently high OMA at a target bandwidth remains a challenge.

Accordingly, it may be understood that there may be significant problems and shortcomings associated with current solutions and technologies for providing high-bandwidth optical waveguide modulators with a suitably low OMA loss.

SUMMARY

Accordingly, the present disclosure relates to an optical waveguide modulator comprising: an input optical port for receiving input light, an output optical port for outputting modulated light; first and second waveguide arms extending optically in parallel between the input and output optical ports to guide the input light from the input port to the output port along two light paths, a plurality of N modulating subsystems sequentially disposed along the first and second waveguide arms, wherein N≥2, and a plurality of N electrical drive circuits for individually driving the N modulating subsystems, each of the N electric drive circuits configured to provide a differential drive signal to each of the first and second waveguide arms of one of the N modulating subsystems. Each modulating subsystem may comprise a first pair of electrodes disposed along a length portion of the first waveguide arm at opposite sides thereof so as to be electro-optically coupled thereto, and a second pair of electrodes disposed along a length portion of the second waveguide arm at opposite sides thereof so as to be electro-optically coupled thereto, with each of the N electric drive circuits electrically coupled to each electrode of the first and second pairs of electrodes of one of the N modulating subsystems for differentially driving both the first and second pairs of electrodes of said modulating subsystem separately from other modulating subsystems.

According to an aspect of the present disclosure, the modulator may comprising a substrate comprising semiconductor material wherein the first and second waveguide arms and the plurality of N modulating subsystems. Each of the N modulating subsystems may comprise a first p/n junction formed in the length portion of the first waveguide arm and electrically connected between the first pair of electrodes, and a second p/n junction formed in the length portion of the second waveguide arm and electrically connected between the second pair of electrodes. Each of the first and second p/n junctions may be configured to vary a refractive index in the respective length portion of the first or second waveguide arm in response to the differential drive signal provided to the corresponding first or second pair of electrodes. In one implementation each of the N electrical drive circuits may comprise two differential drivers that are DC-coupled to the first and second pairs of electrodes of one of the N modulating subsystems, the two differential drivers configured to convert an input data signal into two synchronous differential drive signals having a DC shift therebetween.

In accordance with an aspect of the present disclosure, the plurality of N electrical drive circuits may comprise an equalizing circuit configured to drive one of the N modulating subsystems, termed an equalizing subsystem, with a differential drive signal that is inverted relative to at least one other differential drive signal that is provided to at least one other modulating subsystem from the plurality of N modulating subsystems, thereby affecting a modulation of the input light that subtracts from a modulation of the input light by the at least one other modulating subsystem with a relative time delay that is selected so as to at least partially compensate for a modulation signal dispersion associated with a high-frequency roll-off of a light modulation efficiency of the modulating subsystems.

Another aspect of the present disclosure relates to a method of modulating input light, the method comprising:

a) receiving the input light into an input optical port of an optical modulator comprising first and second waveguide arms extending optically in parallel between the input optical port and an output optical port, for transmitting the input light from the input port to the output port along two light paths traversing N successive modulating sections of the optical modulator, N≥2;

b) providing a differential drive signal separately to each of the plurality of N successive modulating sections of the optical modulator generally in synchronism with the transmission of the input light along the waveguide arms; and, c) in each of the N modulating sections, applying the differential drive signal, or a signal related thereto, separately to each of the first and second waveguide arms.

The method may include converting an input data signal into N differential drive signals that vary with time in a substantially same manner defined by the input data signal. Step (c) may comprise: in at least one of the N modulating sections, applying one of the N differential drive signals to a first pair of electrodes disposed within a respective modulating section so as to be electro-optically coupled to the first waveguide arm along a length portion thereof located within said modulating section, and applying an inverted version of the one of the N differential drive signals to a second pair of electrodes disposed within said modulating section so as to be electro-optically coupled to the second waveguide arm along a length portion thereof located within said modulating section, so as to effect a dual-differential push-pull modulation of the input light in each of the N successive modulating sections of the optical modulator.

An aspect of the present disclosure relates to a method of modulating input light wherein the plurality of N modulating sections comprises a modulating section and an equalizing section, the method further comprising converting an input data signal into first and second differential drive signals that vary with time in a substantially same manner defined by the input data signal. The method may further comprise applying, in the modulating section, the first differential drive signal to a first pair of electrodes electro-optically coupled to the first waveguide arm within the first modulating section, and applying an inverted version of the first differential drive signal to a second pair of electrodes electro-optically coupled to the second waveguide arm within the first modulating section, so as to effect a first dual-differential push-pull modulation of the input light propagating through the first modulating section of the optical modulator. The method may further include applying, in the equalizing section, an inverted version of the second differential drive signal from the plurality of N differential drive signals to a first pair of electrodes electro-optically coupled to the first waveguide arm within the equalizing section, and applying the second differential drive signal to a second pair of electrodes electro-optically coupled to the second waveguide arm within the equalizing section, so as to effect a second dual-differential push-pull modulation of the input light propagating through the equalizing section of the optical modulator. The second dual-differential push-pull modulation substantially subtracts from the first dual-differential push-pull modulation with a relative delay therebetween that is selected so as to at least partially compensate for a modulation dispersion associated with a high-frequency roll-off of a light modulation efficiency of the modulating subsystems.

An aspect of the present disclosure relates to an optical waveguide modulator comprising an input optical port for receiving input light, an output optical port for outputting modulated light, first and second waveguide arms extending optically in parallel between the input and output optical ports to guide the input light from the input port to the output port along two light paths, and first and second p/n junction formed in the first and second waveguide arm, respectively. Each of the first and second p/n junctions is provided with a cathode electrode electrically connected to the n-side of said p/n junction and an anode electrode electrically connected to the p-side of said p/n junction. An electrical drive circuit is further provided that is configured for dual-differential driving the first and second p/n junctions; the electrical drive circuit comprises two differential drivers that are configured to convert an input data signal, or a signal obtained therefrom, into two synchronous differential signals having a DC shift therebetween, wherein each of which is DC-coupled to the cathode electrode of one of the p/n junctions and the anode electrode of the other one of the p/n junctions.

An aspect of the present disclosure relates to an optical waveguide modulator comprising an input optical port for receiving input light, an output optical port for outputting modulated light, first and second waveguide arms extending optically in parallel between the input and output optical ports to guide the input light from the input port to the output port along two light paths, and first and second p/n junction formed in the first and second waveguide arm, respectively. Each of the first and second p/n junctions is provided with an anode electrode electrically connected to the p-side of said p/n junction, with the n-side of said p/n junction connected to a ground plane. Each of the anode electrodes may form an electrical transmission line with the ground plane. The optical waveguide modulator may further comprise a differential driver that is configured to be fed with a negative supply voltage is DC-coupled to the anode electrodes of each of the first and second p/n junctions to apply complementary single-ended signals thereto for affecting a push-pull modulation of the input light. Each of the anode electrodes may be terminated with a resistor connection to the ground plane.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION

Figure 1:
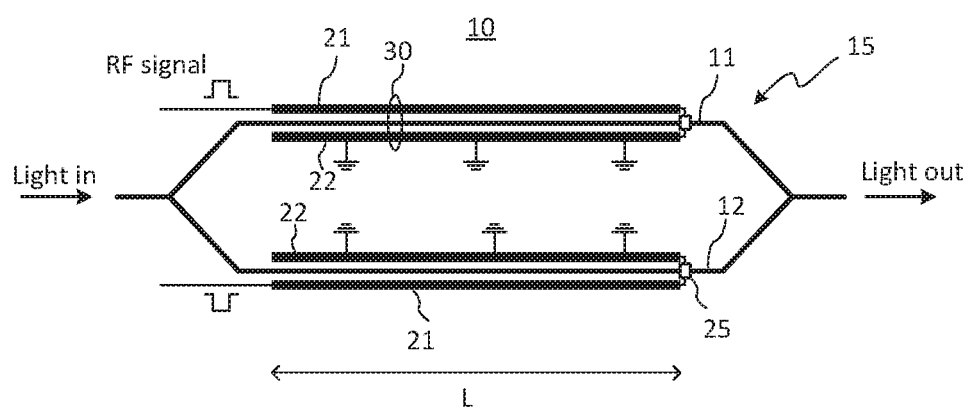
FIG. 1 is a schematic block diagram of a travelling-wave waveguide Mach-Zehnder modulator.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
CMOS Complementary Metal-Oxide-Semiconductor
BiCMOS Bipolar CMOS
GaAs Gallium Arsenide
InP Indium Phosphide
LiNbO3 Lithium Niobate
PIC Photonic Integrated Circuits
SOI Silicon on Insulator
SiP Silicon Photonics
PSK Phase Shift Keying
BPSK Binary Phase Shift Keying
QAM Quadrature Amplitude Modulation
QPSK Quaternary Phase Shift Keying
RF Radio Frequency
DC Direct Current
AC Alternate Current
OSNR Optical Signal to Noise Ratio Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action performed by the optical device itself or by a component thereof rather than by an external agent. Notation Vπ refers to a bias voltage of a Mach-Zehnder modulator (MZM) that corresponds to a change in a relative phase delay between arms of the MZM by π radian (rad), or 180 degrees, which corresponds to a change from a minimum to a next maximum in the MZM transmission versus voltage. Radio frequency (RF) may refer to any frequency in the range from kilohertz (kHz) to hundreds of gigahertz (GHz). The term p/n junction encompasses p/i/n junctions having a region of substantially intrinsic conductivity located between the p-doped and n-doped regions. The term "differential signal" refers to a signal that is transmitted using two single-ended signals having complementary AC components. The term "inverted differential signal" refers to a differential signal having AC components of its constituent single-ended signals inverted relative to those of a reference differential signal, or a differential signal having high-low and low-high transitions switched.

The present disclosure relates to an electro-optic modulator (EOM) and a related method in which two or more optical waveguides, also referred to herein as the waveguide arms, are used to guide input light from an input optical port to an output optical port along two or more optical paths; such EOMs may also be referred to herein as an optical waveguide modulator or as an optical modulator. One aspect of the present disclosure relates to a multi-section EOM wherein the optical paths traverse N successive modulating sections of the optical modulator, N≥2, or preferably N≥3 in at least some embodiments. An electrical drive circuit is used to provide a differential drive signal separately to each of the N successive modulating sections of the EOM generally in synchronism with the transmission of the input light along the waveguide arms, and to apply the differential drive signal, or a signal related thereto, separately to each of the waveguide arms. In some embodiments, one or more of the modulating sections may be driven by inverted differential signals so as to operate as an equalizing section or sections. The EOM may include multiple electrodes that are disposed to modulate the light propagating in the waveguide arms in response to an applied electrical drive signal. The electrodes are arranged in a plurality of N electrode subsystems that are sequentially disposed along the direction of light propagation, so that each of the electrode subsystems defines one of the N consecutive modulating sections of the EOM. In example embodiments described hereinbelow the EOM is in the form of, or includes, an MZM, and each of the modulating sections includes two electrode pairs, each electrode pair sandwiching a length portion of one of the waveguide arms so as to be electro-optically coupled thereto. The EOM thus may include 4N separate electrodes, which may be dual-differentially driven using N electric drive circuits, each configured to provide a differential drive signal to each of the two electrode pairs of one of the N modulating sections. The N electric drive circuits may be configured to convert an input data signal into N differential drive signals that vary with time in a substantially same manner defined by the input data signal. By suitably selecting the electrode length of each of the modulating sections and the number of the modulating sections, a target modulation bandwidth may be achieved simultaneously with a target OSNR, or a target OMA for OOK modulation, or a target output power for a BPSK modulation.

In accordance with an aspect of the present disclosure, example embodiments of the EOM described hereinbelow may implement dual-differential driving of each of the modulating sections of the EOM, which may include, for at least one of the modulating sections, applying one of the N differential drive signals to a pair of electrodes sandwiching a length portion of the first waveguide arm within the modulating section, and applying an inverted version of the one of the N differential drive signals to a second pair of electrodes sandwiching a corresponding length portion of the second waveguide arm located within the modulating section, so as to affect a dual-differential push-pull modulation of the input light in each of the N successive modulating sections of the EOM.

Figure 2:
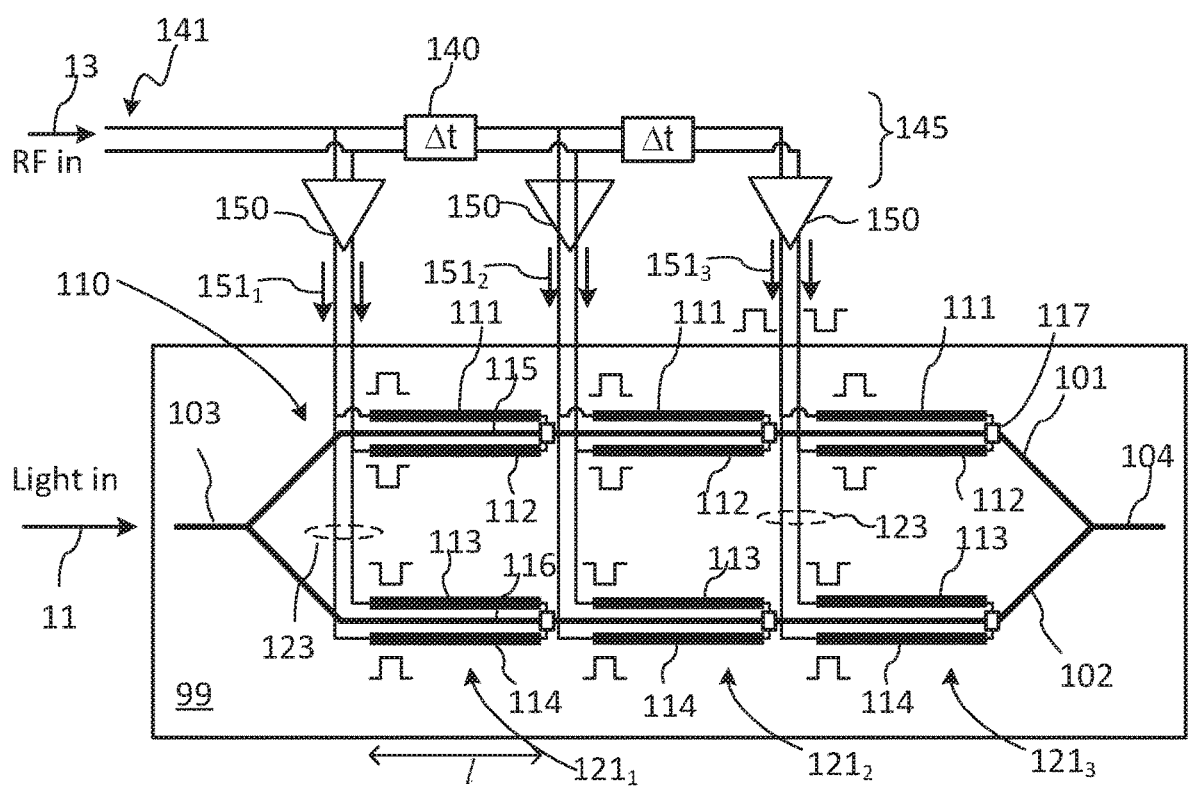
FIG. 2 is a schematic diagram of an optical modulator with segmented electrode system and a dual-differential drive circuit for each electrode subsystem, with outer electrodes connected to receive a same single-ended signal complementary to that received by the inner electrodes.

With reference to FIG. 2, there is illustrated an embodiment of a multi-section EOM 100 which includes N=3 modulating subsystems by way of example; it will be appreciated that other embodiments may include a different number of sections, so that N can vary from two to ten and more. The multi-section EOM 100, and modifications thereof illustrated in FIGS. 7, 10, 11, 13, 16 may also be referred to as an optical waveguide modulator, or simply as the modulator device. The EOM 100 includes an MZM 110 having an input optical port 103, an output optical port 104, first and second waveguide arms 101 and 102, and 4N=12 separate electrodes arranged to form three modulating subsystems 1211, 1212, and 1213, which may be generally referred to as the modulating sections 121 of the EOM 100. The modulating sections 121 are sequentially disposed one after another in the direction of light propagation from the input optical port 103 of the MZM 110 to its output optical port 104. The waveguide arms 101, 102 traverse the modulating sections 1211, 1212, and 1213 in sequence. Each of the modulating sections 121 includes a first pair of electrodes 111, 112 disposed along a length portion 115 of the first waveguide arm 101 at opposite sides thereof, i.e. sandwiching a length portion 115 of the first waveguide arm 101 so as to be electro-optically coupled thereto. Each of the modulating sections 121 further includes a second pair of electrodes 113, 114 disposed along a length portion 116 of the second waveguide arm 102 at opposite sides thereof sandwiching a corresponding length portion of the second waveguide arm 102 and being electro-optically coupled thereto. The four electrodes 111-114 within each of the modulating section 121 may be referred to as the electrode subsystem 121. The term "electro-optically coupled" in the context of this disclosure means that a suitable voltage applied across the electrode pair changes the refractive index or any other optical property in the length portion of the waveguide arm between the two electrodes of the pair, for example by means of inducing an electrical field or an electrical current flow across the waveguide, or by changing the concentration of free carriers therein.

In one embodiment each of the first and second pairs of electrodes (111,112) and (113,114) in each modulating subsystem 121 may constitute a coplanar transmission line that is differentially driven from one end and is terminated at the other end with a suitable line termination 117 so as to suppress back reflections.

The electrodes 111 and 114 of each of the modulating sections 121 may also be referred to as the outer electrodes, and the electrodes 112 and 113—as the inner electrodes. Each electrode 111, 112, 113, or 114 of any one of the N electrode subsystems 121 is spaced apart from the electrodes of the adjacent modulating section 121 so that each of the modulating sections 121 can be dual-differentially driven separately from other modulating sections, as described hereinbelow. The electrodes 111-114 of all three modulating subsystems 121 together can be viewed as separate segments of four non-contiguous electrodes extending along most of the length of the two waveguide arms, and may be referred to as the electrode segments. In the illustrated embodiment each of the electrodes 111, 112, 113, and 114 is of a substantially same length l, but in other embodiments the electrode length may differ from one modulating section 121 to another. The MZM 110 may also include one or more bias electrodes which are not shown in FIG. 2 in order not to obscure the drawing and its description.

In one embodiment, the waveguides of the MZM 110 and the plurality of electrodes 111-114 are formed in or upon a same face of a substrate 99 that may be made with an electro-optic and/or semiconductor material. The term substrate as used herein encompasses multi-layer structures also known as wafers. In one embodiment, the substrate 99 may be made with a semiconductor material, such as for example Silicon (Si), GaAs based, or InP based, or any other suitable semiconductor. In one embodiment, the substrate 99 may be made of a suitable electro-optic material such as but not exclusively LiNbO3. The substrate 99 may also be referred to herein as the first substrate or the first wafer.

Figure 3:
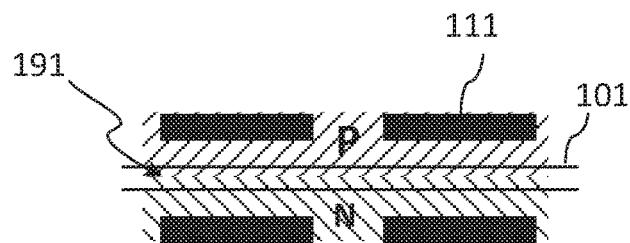
FIG. 3 is a schematic expanded view of a portion of a waveguide arm of one embodiment of the modulator of FIG. 2 with a modulating p/n junction.

In one embodiment the substrate 99 is a SOI substrate or wafer, with the waveguides forming the MZM 110 having their cores defined in a silicon layer of the SOI substrate 99. In one embodiment a p/n junction or junctions may be formed across each of the waveguide arms 101, 102 in their length portions 115 between the respective electrodes, as schematically illustrated in FIG. 3 showing a p/n junction 191 in a section of the first waveguide arm 101 by way of example. The p/n junction enables to modulate the refractive index in the waveguide by varying the concentration of free charge carriers therein in response to an applied voltage, thereby forming an optical phase modulator in the waveguide. In one embodiment the p/n junction 191 may be reversed-biased to operate as a carrier depletion based high-speed phase modulator (HSMP). In some embodiment the p/n junction 191 may be in the form of a PIN junction, with an intrinsic (I) region in the middle of the waveguide core sandwiched between a P-doped and an N-doped regions. It will be appreciated that a waveguide MZM with p/n junction based HSPMs in its arms may also be formed in semiconductor materials other than Si, and corresponding embodiments of the EOM 100 are within the scope of the present disclosure.

Turning back to FIG. 2, the EOM 100 may further include a plurality of differential drivers 150 for separately driving each of the modulating section 121 with a respective differential drive signal 151$_1$, 151$_2$, or 151$_3$, and electrical drive circuitry configured so that each MZM arm 101, 102 in each of the modulating sections 121 can be differentially driven separately from other modulating sections. As illustrated in FIG. 2, this circuitry may include differential electrical signal pathways 123 connecting the first and second pairs of electrodes (111, 112) and (113, 114) in each of the modulating sections 121 to a corresponding differential driver 150, so that an $i^{th}$ modulating section 121$_i$ is driven by an $i^{th}$ differential drive signal 151$_i$, i=1, 2, or 3. Although illustrated as continuous, in some embodiments the electrical signal pathways 123 may be configured to provide AC coupling of the differential drive signals 151$_i$, or selected single-ended components thereof, to some or all of the electrodes 111-114, for example by including one or more capacitors. The electrical signal pathways 123 may be formed at least in part upon the same substrate as the electrodes 111-114, or may be provided on a separate driver chip. In some embodiments the electrical driving circuit of the EOM 100, which includes the differential drivers 150 and an input feed circuit 145, may be implemented in part or in full on the same substrate 99 as the waveguides 101, 102 and the electrodes 111-114. In some embodiments an additional DC bias voltage may be provided to one of the electrodes in each electrode pair 111, 112 and 113, 114 from a DC bias source (not shown in FIG. 2). In some embodiments one or more of the electrical drive circuits that connect to each of the electrode subsystems 121 may include two differential drivers configured to generate two complementary pairs of single-ended signals for differentially driving the first pair of electrodes (111, 112) and the second pair of electrodes (113, 114), for example as described hereinbelow with reference to FIGS. 9, 17, and 18. The term 'differential signal' is understood herein to mean a signal formed by two single-ended electrical signals having complementary AC components. The differential drive signals 151$_1$, 151$_2$, and 151$_3$, which may generally be referred to as the differential signals 151, may be characterized by a peak-to-peak voltage swing Vpp. In one embodiment Vpp=2V$_{max}$, where Vmax is a peak-to-peak voltage swing of each of the complementary single-ended signals forming the differential drive signal 151.

The EOM 100 may further include an electrical input port 141 configured to receive an input data signal 13, and an input feed circuit 145 that connects the electrical input port 141 to each of the electrical drivers 150. Each of the N electrical drivers 150 may be configured to convert the input electrical data signal 13 into the respective differential drive signal 151$_i$, i=1, . . . , N, which is then provided to each of the electrode pairs (111,112) and (113,114). In one embodiment the differential drivers 150 are linear, in the sense that their outputs are linear functions of their inputs. In one embodiment, each of the differential drivers 150$_i$ may be configured to have an independently adjustable gain so as to output the differential drive signal 151$_i$ with an independently adjustable amplitude.

In some embodiments the input feed circuit 145 may further be configured to provide the input data signal 13 to each of the N differential drivers 150 with a different time delay $\Delta t_i$, which may be selected so as to synchronize the provisioning of the differential electrical drive signals 151$_i$ to the consecutive modulating sections 121 with the propagation of the input light 11 along the first and second waveguide arms 101, 102. In one embodiment the input feed circuit 145 may include one or more, for example (N−1), delay lines 140 to provide the desired time delays $\Delta t_i$ in the delivery of the input data signal 13 to the respective differential drivers 150, and further to the modulation sections 121 in the form of the respective differential drive signals 151$_i$. In one embodiment, the delay lines 140 may be independently adjustable.

Figure 4:
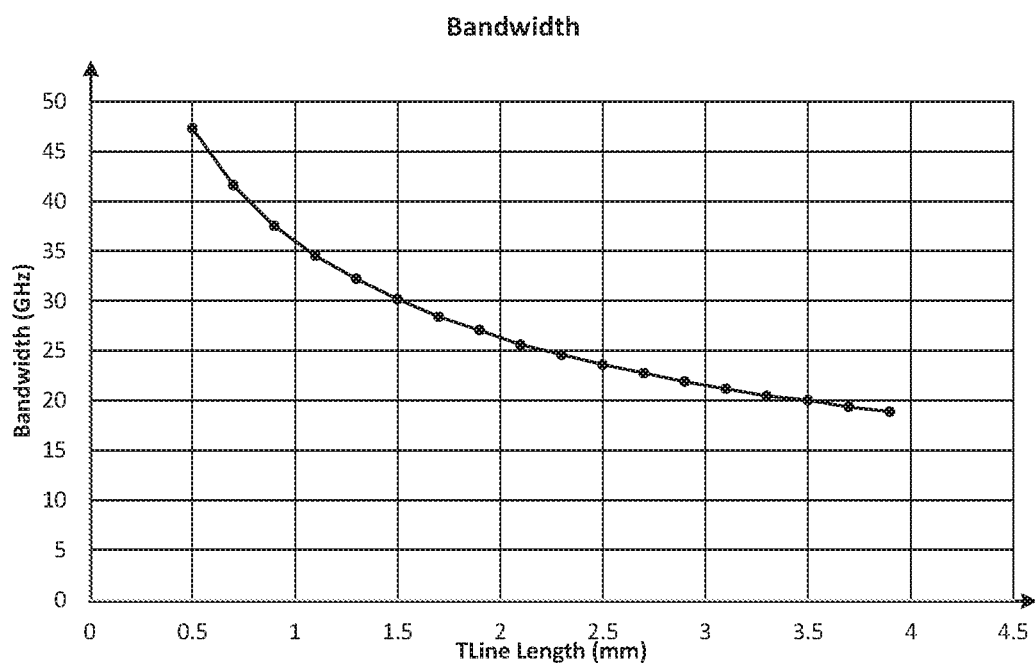
FIG. 4 is a graph illustrating the modulation bandwidth as a function of electrode length for a Silicon-based modulator.

Turning now to FIG. 4, there is illustrated an example dependence of a modulation bandwidth of an MZM formed in a SiP chip with depletion-mode HSPMs upon the electrode length l. At high frequencies the pairs of electrodes sandwiching the modulator's arms each form a transmission line along which the modulating drive signal 151 propagates. Due to parasitic resistance and capacitance associated with the transmission line, the longer the drive signals has to travel along the transmission line formed by the modulator's electrodes, the smaller is the attainable modulation bandwidth of the MZM. These parasitic resistance and capacitance in the illustrated example of a SiP EOM originate primarily from the reversed-biased p/n junction forming the HSPM, but may have a different origin in other embodiments. The modulation bandwidth (BW) of a SiP EOM driven using a single-segment transmission line may be estimated as $$BW \propto \sqrt{\frac{1}{C_{pn} R_{pn} Z_o L}} \quad (1)$$

where $C_{pn}$ and $R_{pn}$ are the parasitic capacitance and resistance of the reverse-biased PN junctions, Zo and L are the characteristic impedance and length of the transmission lines. By way of example, a target modulation bandwidth of 35 GHz may require the length l of the electrodes to be no more than 1 mm for an example EOM of FIG. 4 embodied with silicon waveguides and depletion-mode p/n junction HSPMs. However, efficient modulation of the propagating light with a target peak-to-peak voltage Vpp may require a substantially greater electro-optic interaction length in the waveguide arms. Advantageously, by using two or more separate electrode subsystems 121 of suitably small length l disposed one after another along the waveguide arms, both the target modulation bandwidth and a maximum attainable OSNR level at the modulator output may be simultaneously achieved. Accordingly, in one embodiment the length l of the electrodes 111-114 may be selected based on the target modulation bandwidth, and the number N of the electrode subsystems 121 in the optical modulator 100 may be selected based on a peak-to-peak voltage Vpp that is available from the differential drivers 150 and a target modulation efficiency, or a target OSNR level at the output of the modulator.

Furthermore, by driving each of the electrode pairs 111, 112 and 113, 114 in each of the electrode sub-systems 121 with a respective differential signal 151, the modulation efficiency of each of the modulating sections 121 may be substantially enhanced for the same peak-to-peak voltage swing Vpp in the differential signal 151, as compared to the conventional MZM driving scheme of FIG. 1 wherein the inner electrodes are grounded so that each of the waveguide arms is modulated with a single-ended signal. Advantageously, with the dual-differential driving of each of the electrode subsystems 121 as illustrated in FIG. 2, a two times smaller peak-to-peak voltage Vpp may be used to produce the same modulation of the refractive index in each of the waveguide arms as compared to the MZM of FIG. 1.

In some embodiments it may be desirable to keep the peak-to-peak voltage Vpp=2 Vmax of the differential drive signal 151 below a specific value. In some embodiments, Vpp may be limited by the peak-to-peak voltage Vmax of each single-ended component of the differential drive signal 151 that is available from the drive electronics. By way of example, in embodiments wherein the differential drivers 150 are fabricated using the BiCMOS technology, Vmax may be limited by a breakdown voltage of a Si-based NPN transistor, which is about 1.8V and thus may necessitate using Vmax smaller than 1.8V, for example 1.5V, yielding a maximum attainable Vpp of about 3V to 3.5V. Advantageously, the dual-differential driving scheme of the type illustrated in FIG. 2 or FIG. 9 described hereinbelow enables to obtain a same modulation efficiency with a two times smaller total length of the electrodes L=N·l for a given Vpp value, as compared to the differential driving scheme of FIG. 1.

In some embodiments, both the Vpp and L may be limited by requirements on the EOM design so that the modulation efficiency that is achievable from the EOM is less than theoretically possible; this may be understood by noting that the modulation efficiency of an MZM is a function of a ratio $k=Vpp/V\pi$ of the peak-to-peak voltage Vpp of the differential drive signal to the $V\pi$ voltage of the MZM, which is generally inversely proportional to the total electrode length L. The term "modulation efficiency" may refer to the optical modulation amplitude (OMA) in case of the OOK modulation when the MZM may be biased at a mid-point of its transmission characteristic, or to the optical power of BPSK modulated light at the modulator output in case of the BPSK modulation, when the modulator is biased at a transmission minimum. It can be shown that for the OOK modulation the maximum modulation efficiency is achieved for Vpp=$V\pi$ for the differential drive scheme of FIG. 1, and for Vpp=Vpi/2 for the dual differential modulation as illustrated in FIG. 2. For $Vpp/V\pi 0$ smaller than about 0.4, the dual-differential modulation yields an improvement in modulation efficiency of 2-3 dB. For the BPSK modulation the maximum modulation efficiency is achieved for Vpp=2 $V\pi$ for the differential drive scheme of FIG. 1, and for Vpp=$V\pi$ for the dual differential modulation as illustrated in FIG. 2. For $Vpp/V\pi$ smaller than about 0.5, the dual-differential modulation yields an even greater improvement in modulation efficiency of 5-6 dB.

By way of example, an embodiment of the modulator device 100 with the MZM formed in a SiP chip with depletion-mode HSPMs, three electrode subsystems 121, and the electrode length l of 1 mm in each subsystem 121, and the dual-differential driving with Vpp=2 Vmax=3V provides a 35 GHz bandwidth at an optimum OSNR.

Figure 5:
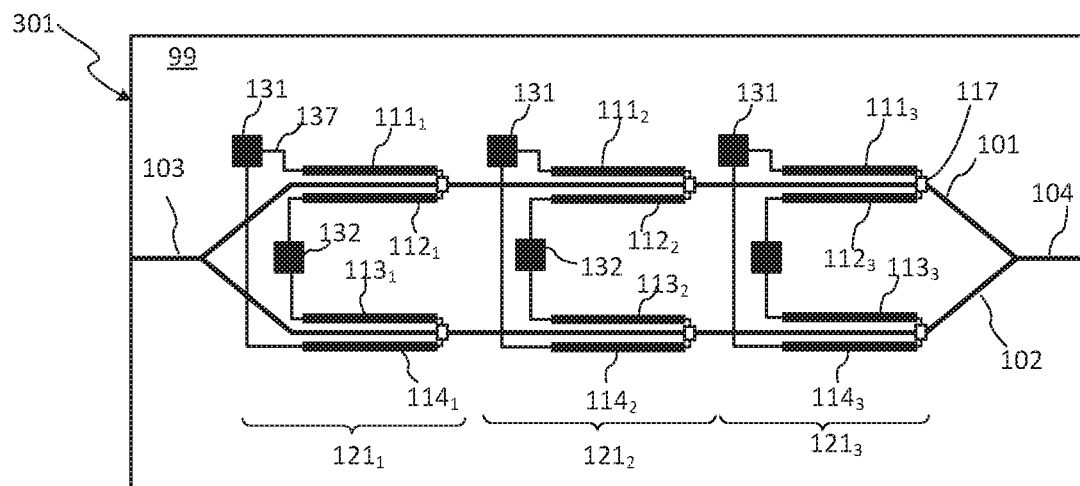
FIG. 5 is a schematic diagram of a photonics chip of an embodiment of the optical modulator of FIG. 2 showing electrical contacts and differential signal paths for driving each modulating section, with interconnected outer electrodes and interconnected inner electrodes in each section driven by complementary single-ended signals.
Figure 6:
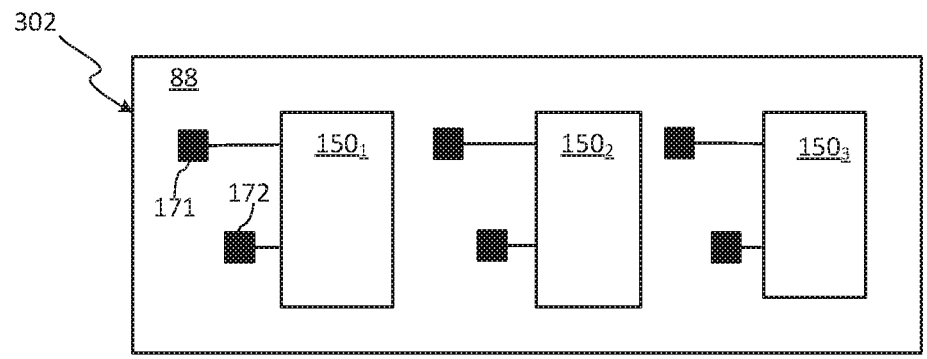
FIG. 6 is a schematic diagram of a driver chip for operating with the photonics chip of FIG. 5.

Turning now to FIGS. 5 and 6, there is schematically illustrated an example photonics chip 301 wherein the MZM 110 and three electrode subsystems $121_i$, i=1, 2, ..., 3, are formed upon a first substrate 99, with the differential drivers 150 formed upon a second substrate 88. Referring first to FIG. 5, in the illustrated embodiment each of the modulating subsystems 121 further includes a first contact terminal 131 and a second contact terminal 132, and electrical signal paths 137 that connect the first contact terminal 131 to one electrode of each of the first pair of electrodes (111, 112) and the second pair of electrodes (113, 114), and which further connect the second contact terminal 132 to the other electrode of each of the first and second pairs of electrodes (111, 112) and (113, 114). The pair of contact terminals 131, 132 function as a differential input port from which a differential drive signal 151 may be fed to each of the first and second pairs of electrodes (111, 112) and (113, 114). In the illustrated embodiment, the first contact terminal 131 in each modulating subsection is connected to the outer electrodes 111 and 114, while the second contact terminal 132 is connected to the inner electrodes 112, 113. The contact terminals 131, 132 may be embodied in a variety of ways that enable electrical connections between the photonics chip 301 and the driver chip 302, including but not limited to metalized contact pads, bond wires, or metal pillars.

Referring to FIG. 6, a modulator driver chip 302 that is configured to operate with the photonics chip 301 may include the plurality of differential drivers 150i, i=1, ..., N, one for each of the N modulating sub-sections 121 of the photonics chip 301, each of which configured to generate a differential drive signal 151 at a differential output port formed by a pair of contact terminals 171, 172. The driver chip 302 may further include an input signal port (not shown) for receiving an electrical data signal 13 as illustrated in FIG. 2, and a feed circuit (not shown) to provide the received data signal to the differential drivers 150i, as described hereinabove with reference to FIG. 2.

When the chips 301, 302 are assembled together, for example using hybrid integration, the N pairs of contact terminals 171, 172 of the driver chip 302 are electrically connected to the respective N pairs of input contact terminals 131, 132, for example by flip-chip mounting or wire bonding, so as to provide the differential drive signals 151i from each of the N electric drive circuits 150i to each of the first and second pairs of electrodes (111,112) and (113,114) of the respective modulating subsystem 121 of the photonics chip 301.

By way of example, the photonics chip 301 may be a SiP chip with the first substrate 99 in the form of a SOI substrate or wafer, and the driver chip 302 may be a CMOS or BiCMOS chip flip-chip mounted on top of the SiP chip 301 so that the contacts terminals 131, 132 of each of the three modulating sections 121 are in direct contact with the respective contact terminals 171, 172 of the corresponding driver 150 of the driver chip 302, for example using metal pillars.

FIGS. 2 and 5 illustrate example EOM embodiments wherein the outer electrodes 111, 114 within each modulating subsystem 121 are electrically connected to each other and may also be connected to a first contact terminal 131, and the inner electrodes 112, 113 are electrically connected to each other and may also be connected to the second contact terminal 132, so that in operation the inner electrodes 112, 113 are driven by a first single-ended signal component of the modulating drive signal 151, and the outer electrodes 111, 114 are driven by a second single-ended signal component of the modulating drive signal 151 that is complementary to the first single-ended component. It will be appreciated however that in other embodiments the four electrodes 111-114 in each modulating subsystems 121 may be connected and driven in a different way, for example as defined by the relative orientation of the modulating p/n junctions in the first and second waveguide arms.

Figure 7:
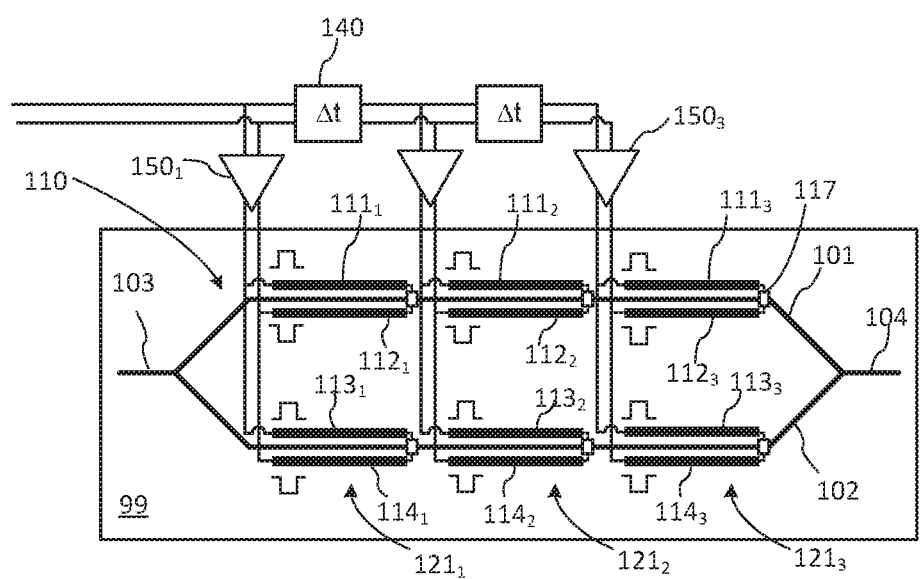
FIG. 7 is a schematic diagram of another embodiment of an optical modulator with segmented electrode system and a dual-differential drive circuit for each electrode subsystem, in which outer electrodes are connected to receive complementary single-ended signals.
Figure 8:
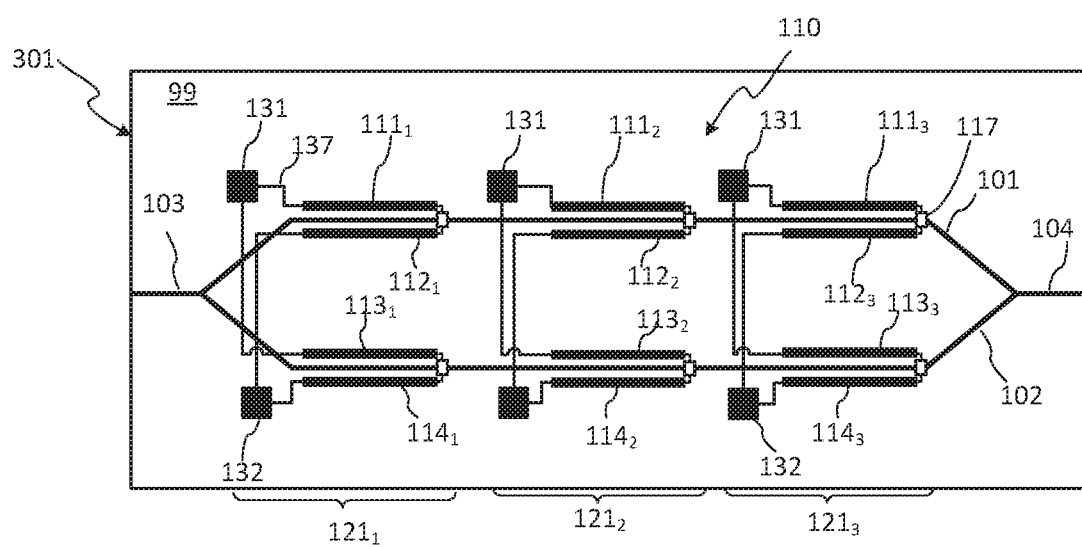
FIG. 8 is a schematic diagram of a photonics chip of an embodiment of the optical modulator of FIG. 7 showing electrical contacts and differential signal paths for driving each modulating section, with each inner electrode electrically coupled to a different outer electrode of the modulating section.

Turning to FIG. 7 there is illustrated an embodiment of the modulator device 100 that may be substantially as described hereinabove with reference to FIG. 2 but wherein the inner electrodes 112, 113 in each modulating subsystem 121 are driven in counter-phase by the two complementary single-ended components of the differential drive signal 151. Similarly, the outer electrodes 111, 114 in each modulating subsystem 121 are also driven in counter-phase by the two complementary single-ended components of the differential drive signal 151. FIG. 8 illustrates a corresponding example embodiment of the photonics chip 301 wherein each of the first and second terminals 131, 132 in each modulating section 121 connects to one inner electrode 112 or 113 and one outer electrode 111 or 114.

As stated hereinabove, the single-ended components of the electrical signals 151 may be DC coupled or AC coupled to the respective electrodes, with additional DC bias signals optionally added in at least some embodiments. Accordingly, in some embodiments the electrical terminals 131, 132 may be AC coupled to one or both of the respective electrodes in each of the FIG. 6 and FIG. 8 implementations.

Figure 9:
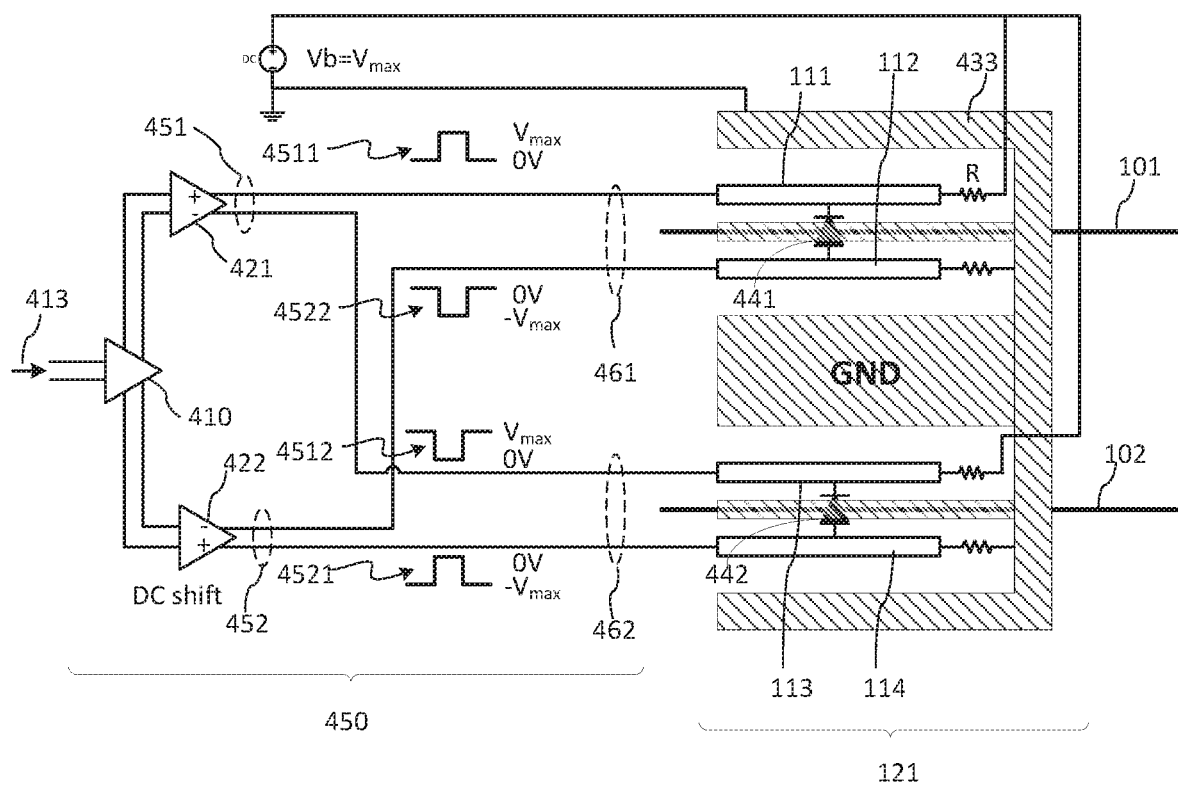
FIG. 9 is a diagram showing a schematic plan view of an example modulating section of an EOM and a block diagram of a dual-differential driving circuit with differential drivers according to one embodiment.

Referring now to FIG. 9, there is schematically illustrated in further detail an example electrical drive circuit 450 that can be used to drive one modulating section 121 of a version of the EOM 100 having p/n junctions based HFPMs in each waveguide arm, according to one embodiment of the present disclosure. A first p/n junction 441 is formed in a length portion of the first waveguide arm 101 located within the modulating section 121, while the second p/n junction 442 is formed in a length portion of the second waveguide arm 102 located within the modulating section 121. Although illustrated with a lumped element symbols, the p/n junctions 441, 442 may extend along the whole length of the respective electrodes 111-114, or at least a portion of their length. In the illustrated embodiment the electrodes 111, 113 directly connect to the n-sides of the respective p/n junctions and may be referred to as the cathode electrodes, or simply the cathodes. The electrodes 112, 114 directly connect to the p-sides of the respective p/n junctions and may be referred to as the anode electrodes, or simply the anodes. It will be appreciated that in other embodiments the first and/or second p/n junctions may have a different orientation relative to each other, for example with the p-side of the second p/n junction 442 on the side of the second inner electrode 113, which will be the anode electrode, while the second outer electrode 114 becoming the cathode electrode.

The electrical drive circuit 450, which represents an embodiment of a dual differential driver (DDD), includes two differential drivers 421 and 422 that are DC-coupled to the first and second pairs of electrode 111, 112 and 113, 114, which provide electrical connections to first and second p/n junctions 441, 442 respectively. In one embodiment the two differential drivers 451, 452 may be cross-coupled to the first and second electrode pairs (111, 112) and (113, 114), so that each of the two differential drivers 421, 422 is coupled to one electrode from each of the first electrode pair (111, 112) and the second electrode pair (113,114). In one embodiment the two differential drivers 421, 422 may be cross-coupled to the first and second electrode pairs (111, 112) and (113, 114), so that one of the two differential drivers 421, 422 is coupled to the cathode electrodes of the first and second electrode pairs and the other one of the two differential drivers 421, 422 is coupled to the anode electrodes of the first and second electrode pairs.

A common signal pre-processing circuit 410 may be optionally provided for feeding each of the differential drivers 421, 422 with the electrical data signal 413, or a signal related thereto. The signal pre-processing circuit 410 may be, for example, a common differential pre-amplifier or a pre-equalizer.

The differential drivers 421 and 422 may be DC-shifted relative to each other to convert a received electrical data signal 413, or a signal obtained therefrom by the common circuit 410, into two synchronous differential signals 451 and 452 with a DC shift therebetween. This DC shift VDC may be selected so that both of the modulating p/n junctions 441 and 442 remain reversed biased as the drive voltage oscillates, so as to operate the p/n junctions 441, 442 in a depletion mode. The single-ended components of the two synchronous differential signals 451 and 452 are then cross-coupled to form two differential drive signals 461 and 462 that drive the respective p/n junctions 441 and 442. In one embodiment the second differential drive signal 462 is an inverted version of the first differential drive signal 461, thereby effecting a dual-differential push-pull modulation of the input light in the modulating section 121.

In one embodiment the two single-ended complementary components 4511 and 4512 of the first differential signal 451 from the first driver 421 alternate in counter-phase about a first common-mode voltage level Vcm1 with a peak-to-peak voltage swing Vmax. The two complementary single-ended components 4521 and 4522 of the second differential signal 452 alternate with the peak-to-peak voltage swing Vmax about a second common-mode voltage level Vcm2, in sync with the first differential signal 451. By selecting the first and second common-mode voltage levels Vcm1 and Vcm2 so that the DC shift $V_{DC}$=(Vcm1−Vcm2) between the differential signals 451 and 452 is equal or greater than Vmax, so that the single-ended components of the first and second differential signals 451, 452 alternate in non-overlapping voltage ranges, and cross-coupling them so that the more positive signals are provided to the cathodes 111 and 113 and the more negative signals—to the anodes 112 and 114, each of the first and second p/n junctions 441, 442 may be operated in a reverse-bias regime.

As illustrated in FIG. 9 by way of example, the two single-ended complementary components 4511 and 4512 of the first differential signal 451 may alternate between 0V and a positive voltage Vmax, resulting in the differential voltage changing between 0V and 2 Vmax. The second driver 422 outputs the second differential signal 452 that is formed of two complementary single-ended signal 4521 and 4522 that oscillate, in sync with the first differential signal 451, between a negative voltage −Vmax and 0V resulting in the differential voltage changing between 0V and −2 Vmax and a negative DC shift $V_{DC}$=Vmax from the first differential signal 421. The zero voltage level (0V) is assumed to be the voltage level half-way between the higher maximum and lower minimum voltages of the single-ended components of the differential signals 451 and 452. In the illustrated embodiment, it corresponds to the electric potential at the ground 433. The differential signals 451, 452 are cross-coupled to the first and second electrode pairs 111, 112 and 113, 114 so that in each electrode pair the cathode electrode of the p/n junction 441 or 442 is fed one of the positive single-ended signals 4511, 4512 and the anode electrode of the p/n junction 441 or 442 is fed one of the DC-shifted negative single-ended signals 4521, 4522. Thus, in operation the two p/n junctions 441, 442 are reversed-biased push-pull modulated with the voltage across each of the p/n junction oscillating in counter-phase between 0V and Vpp=2 Vmax. In the illustrated example embodiment this is assisted by connecting the anode electrodes 112, 114 to the ground 433, and by providing a positive DC bias voltage Vb=Vmax to the cathode-connected electrodes 111, 113, with the differential drivers 421, 422 implemented as current steering circuits. Alternatively, a negative DC bias voltage Vb may be provided to the anode-connected electrodes 112, 114. Furthermore, each of the termination voltages (Vmax for cathodes and 0V for anodes in FIG. 9) could be shifted in the positive or negative direction, as long as the difference between is adequate for maintaining the p/n junction is reverse bias. Advantageously, the illustrated dual-differential DC-coupled modulation scheme provides an effective arm-to-arm phase-modulating voltage swing equivalent to 4 Vmax applied to a single electrode.

Figure 10:
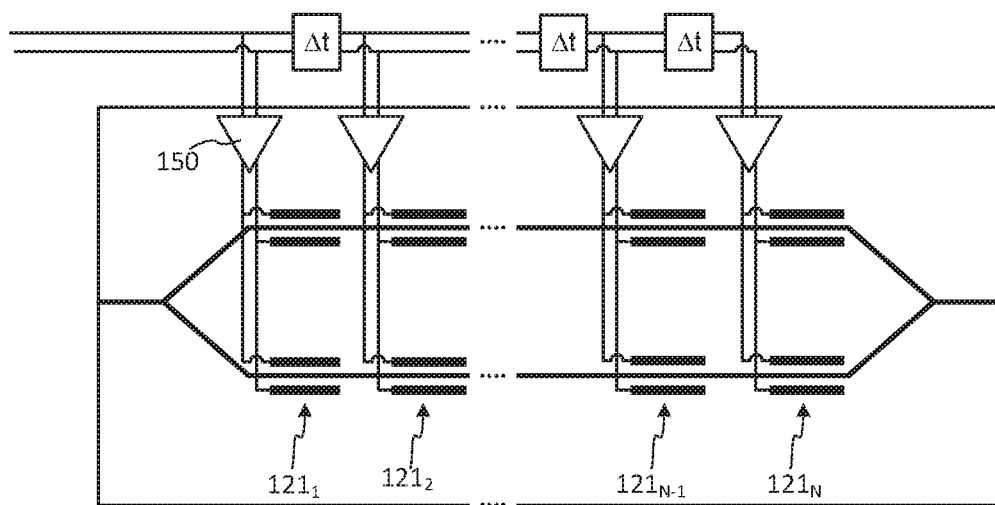
FIG. 10 is a schematic diagram of an optical modulator with segmented electrode system formed of four or more short electrode segments without termination.

Turning now to FIG. 10, there is schematically illustrated an embodiment wherein the number N of the modulating subsections 121$i$, i=1, . . . , N is greater than 3; although only four such subsystems shown, it will be appreciated that there may be one or more modulating subsystems 121 between a second modulating subsystem 121$_2$ and the (N−1)st modulating subsystem 121$_{N-1}$ shown in the figure. By increasing the total number N of electrode subsystems, the electrodes in each subsystem can be made shorter for the same modulation efficiency, which however may increase the overall length of the device due to the greater number of gaps between the electrodes of adjacent modulating subsystems. Generally, EOMs with the total number of modulating subsystem N=10 and greater may be envisioned.

Figure 15A:
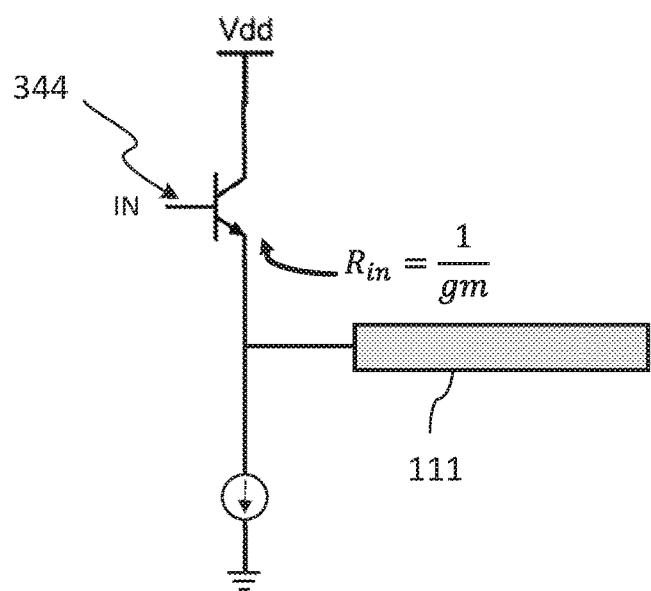
FIG. 15A is a simplified diagram of an electrical drive circuit of one electrode segment.
Figure 15B:
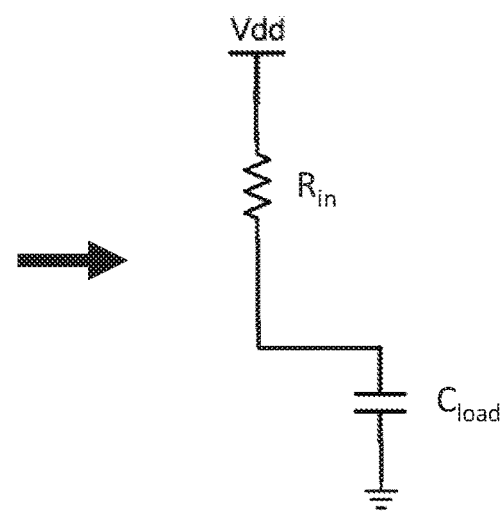
FIG. 15B is a diagram of a simplified equivalent electrical circuit of the driver circuit of FIG. 15A.

Advantageously, using separately driven short electrode segments enables to considerably increase the EOM modulation bandwidth while providing a suitably high output modulation power or the OSNR. When short enough, the electrode segments may be modeled separately as lumped elements rather than a transmission line, and may not require terminations. FIG. 15A illustrates a simplified diagram of an electrical circuit driving one electrode segment 111, with a transistor 344 representing one channel of the differential driver. The electrode segment 111 in the lumped model may be viewed as a capacitive load and modelled as a capacitance $C_{load}$, yielding an equivalent circuit diagram illustrated in FIG. 15B. The modulation bandwidth BW is then controlled by the RC (resistor-capacitor) time constant τ=R·$C_{load}$. The resistance R in the illustrated example may be estimated as approximately equal to an inverse of the transconductance $g_m$ of the transistor 344, R~ 1/$g_m$, so that $$BW = \frac{g_m}{C_{load}} \quad (2)$$

Thus, the modulation bandwidth of the multi-section EOM with short electrode segments may be substantially increased by increasing the transconductance of the differential driver and/or reducing the electrode capacitance $C_{load}$, for example by reduce the segment length. When the multi-section electrode design is combined with the dual-differential driving architecture described hereinabove, both the overall number N of electrode subsystems and the length l of each electrode segment can be reduced, leading to a reduction of power or an increase of bandwidth.

Figure 11:
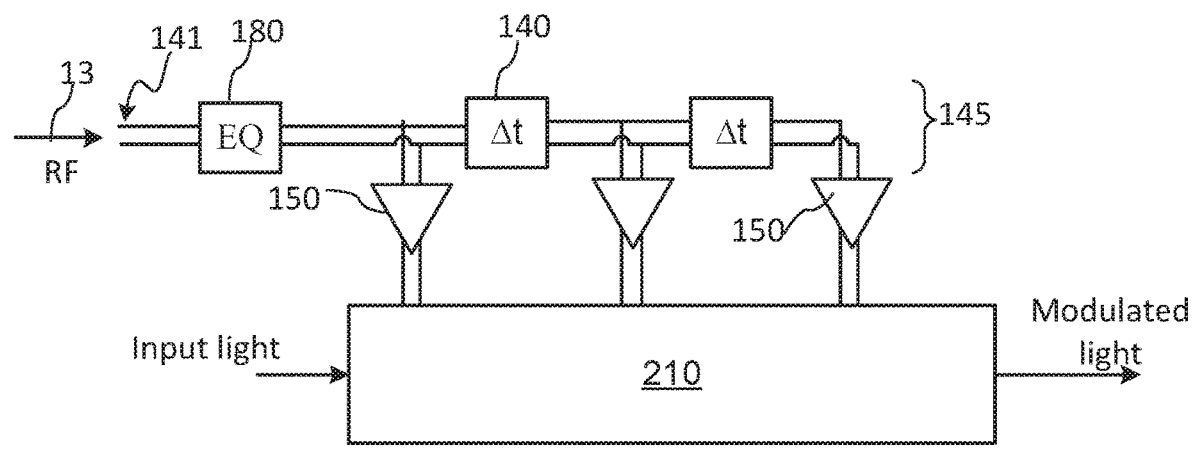
FIG. 11 is a schematic diagram of electrical driving circuitry of the modulator of FIG. 1 with a common pre-equalizer.
Figure 12:
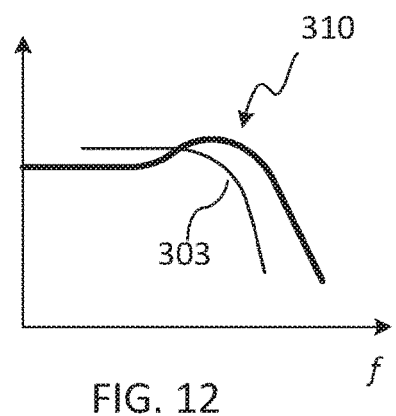
FIG. 12 is a graph schematically illustrating a high-frequency pre-emphasis provided by the pre-equalization circuit.

Turning now to FIG. 11, there is schematically illustrated an embodiment of the modulation device 100 which includes an MZM 210 with multiple modulating subsections and which may be generally as described hereinabove with reference to FIG. 2 and FIG. 7, but with the input feed circuit 145 additionally including a pre-equalization circuit (EQ) 180 connected in the path of the input data signal 13. From the output of the pre-equalization circuit 180 the pre-equalized input data signal 13 is fed, with suitable time delays, to the differential drivers 150, each of which configured to drive one of the four-electrode modulating subsystems of an MZM 210, which are not shown in the figure but may be as described hereinabove with reference to FIGS. 2-8. Although only three differential drivers 150 are shown, corresponding to N=3 modulating subsystems in the MZM 210 (not shown), in other embodiments there may be as few as two and as many as 10 or even 15 modulating subsystems in the MZM 210, with the corresponding number of differential derivers 150. The pre-equalization circuit 180 may be configured to provide a high-frequency pre-emphasis to the input data signal 13 that is then passed to each of the electrical drive circuits 150, as illustrated in FIG. 4. This pre-emphasis is schematically illustrated in FIG. 12 at 310, and may be configured to partially compensate for the high-frequency roll-off of the modulation characteristic of the EOM 210, which is schematically illustrated at 303 in the same figure. This roll-off of the modulation characteristic of the EOM 210 may be associated with bandwidth limitations stemming from various elements in the path of the input data signal, including but not limited to those associated with the modulating subsystem 121 and the preceding electrical circuitry. The high-frequency pre-emphasis may also be used to pre-compensate for bandwidth limitations at an optical receiver side.

Figure 13:
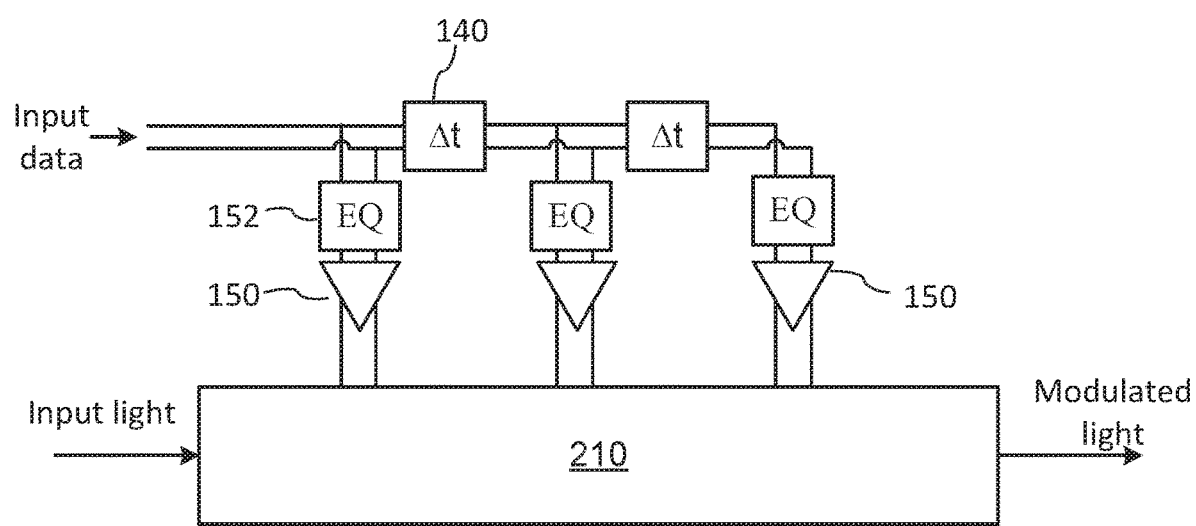
FIG. 13 is a schematic diagram of electrical driving circuitry of the modulator of FIG. 1 with a pre-equalizer in the driving circuit of each electrode subsystem.

Turning now to FIG. 13, there is schematically illustrated another embodiment of the modulation device 100 that may be generally as described hereinabove with reference to FIGS. 2, 7, and 11, but which includes N pre-equalization circuits 152, with N=3 by way of example, each pre-equalization circuit 152 receiving the input data signal 13 and transmitting its output into one of the N differential drivers 150. Similarly to the pre-equalization circuit 180 of FIG. 10, each of the N pre-equalization circuits 152 may be configured to provide a high-frequency pre-emphasis to the input data signal 13 destined to one of the electrical drive circuits 150 so as to pre-compensate for the high-frequency roll-off of the modulation efficiency associated with the corresponding four-electrode subsystem. One advantage of using N separate equalization circuits as first stages of the differential drivers 150 is the ability to adjust the pre-emphasis separately for each of the modulating subsystems, which may be useful for example in embodiments wherein the length of electrodes differs between the modulating subsystems. In some embodiments, the pre-equalization circuits 152 of the individual modulating sections may be present together with a common pre-equalization circuit 180 illustrated in FIG. 12. Referring to both FIG. 12 and FIG. 13, in some embodiments parameters of the equalization circuits 152 and/or 180 may be selected so as to at least partially compensate for bandwidth limitations of other elements or systems in the signal path preceding or following the EOM.

Figure 14:
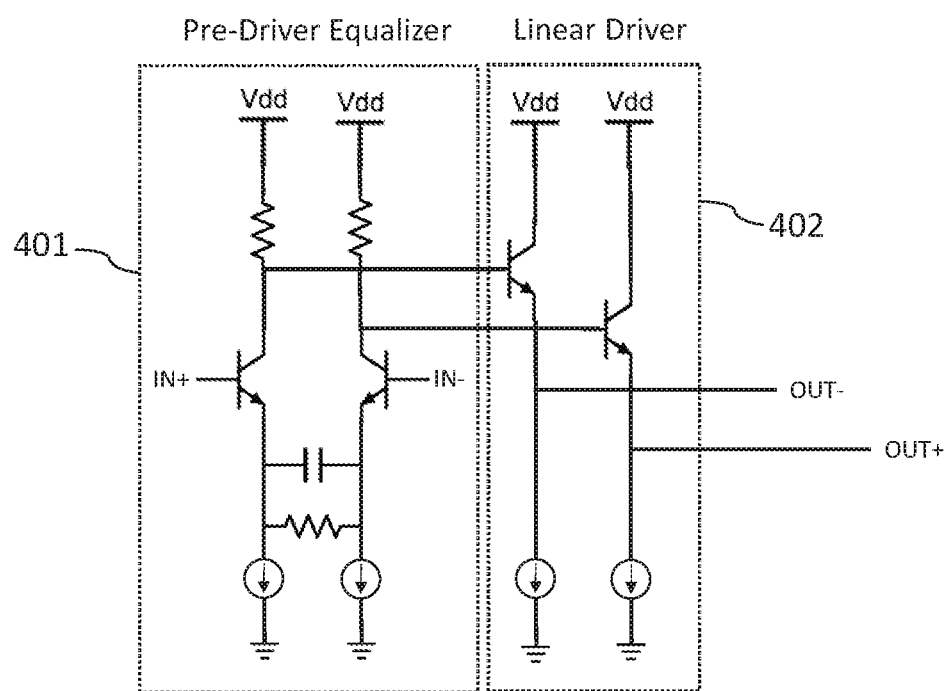
FIG. 14 is a simplified circuit diagram of a linear differential driver with a pre-equalization stage.

Turning now to FIG. 14, there is schematically illustrated a simplified circuit diagram of a version of a pre-equalization circuit 401 and a differential driver 402 which may be implemented using BiCMOS process and variants of which may be used in embodiments of the present disclosure. The pre-equalizer stage 401 equalizes a differential input data signal (IN+, IN−) preemptively with the expectation that the high frequency components of the input data signal will be attenuated by the EOM. By using an emitter-follower or source-follower in the differential driver stage 402, BPSK and multi-level modulation formats become possible because the output of the driver 402 is kept linear.

Figure 16:
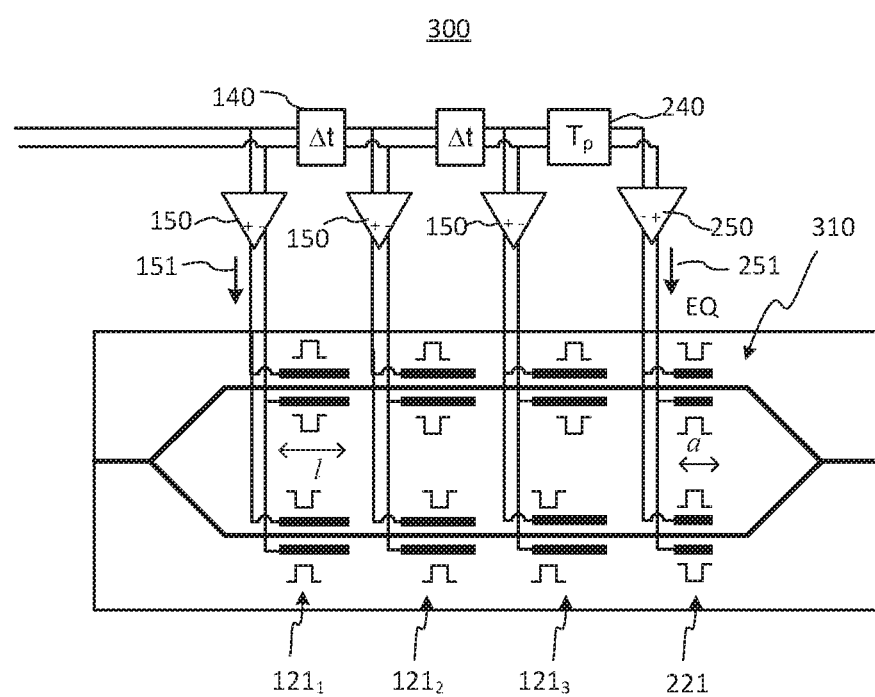
FIG. 16 is a schematic diagram of a sectionalized optical modulator with an equalization section.

Turning now to FIG. 16, there is illustrated a multi-section EOM 300 with a transmitter-side high-frequency pre-emphasis (TXPE) implemented electro-optically. The EOM 300 includes a multi-section MZM 310 with several modulating subsystems or sections 121 disposed one after another along the length of the MZM arms in the direction of light propagation, which may be configured and operate generally as described hereinabove with reference to EOM 100 and with reference to FIGS. 2-15. The EOM 300 further includes an additional modulating subsystem or section 221 that is configured for implementing the electro-optic TXPE and may be referred to herein as the equalizing section 221 or equalizing subsystem 221. In the shown embodiment the equalizing section 221 follows the modulating sections 121 described hereinabove, and may be generally structurally similar to each of the modulating subsections 121, but with the four electrodes that may in some embodiments be of a different length a than the respective electrodes of the modulating subsections 121. In operation the equalizing subsection 221 is driven by an inverted differential drive signal 251 from an auxiliary differential driver 250. The inverted differential signal 251 that drives the equalizing subsystem 250 may be referred to as the equalizing differential signal 251; it is inverted relative to the modulating differential drive signals 151, so that for example a high voltage in the differential drive signal 151 corresponds to a low voltage in the differential equalizing signal 251, and vice versa, thereby effecting a modulation of the input light that subtracts from the modulation of the input light by the modulating subsystem 121. The pre-equalization operation of the EOM 300 may be understood by noting that ideally the RF modulating signal travelling along the electrodes from one modulating section 121 to another should complete the high-low and low-high transitions within one unit interval (UI), or the duration of one symbol or bit of the input data signal. However, due to the bandwidth limitations the RF modulating signal in each UI disperses and interferes with the adjacent intervals, which could corrupt the modulated signal at the EOM output. This dispersion of a signal from a previous UI, termed modulation signal dispersion, may be countered by adding an inverted copy of the modulated signal that is suitably delayed and weighted. In the frequency domain, this may have the effect of attenuating the low frequency components and boosting the high frequency components, resulting in an effective bandwidth expansion.

The description hereinabove with reference to FIGS. 11-14 relates to embodiments wherein the TXPE is performed in the electrical domain before applying the modulating RF signal to sections of the MZM. However, the electrical domain implementation of the TXPE may be challenging at very high bit rates. In the implementation of FIG. 16, the input data signal is delayed, inverted and weighted in the electrical domain using a delay line 240 and the differential driver 250, and an inverted modulating signal is added to the light modulation provided by the modulating subsystems 121 by means of the extra subsystem 221. The equalization weight depends on the ratio between the length a of the electrodes in the TXPE section 221 and the combined electrode lengths of the main modulating subsystems L=N·l. Accordingly, one embodiment may include selecting the electrode length a in the equalizing section 221 of the EOM 300 so as to at least partially compensate for the modulation signal dispersion associated with a high-frequency roll-off of a light modulation efficiency of the modulating subsystems. In some embodiment the electrode length a in the equalization section may also be selected to at least partially compensate bandwidth limitations of a signal path associated with the EOM, such as bandwidth limitations of electrical circuitry in the path of the input data signal and in the optical signal transmission and reception systems after the EOM. In some embodiments, the equalization weight may further be adjusted by adjusting the gain of the differential driver 250. The time delay $T_p$ provided by the equalizing delay line 240 is another adjustable parameter that may be tuned at a device calibration stage to optimize the equalization. This time delay $T_p$ may be selected to be slightly greater than the time delay Δt that is required to synchronize the provisioning of the drive signal 251 with the propagation of modulated light along the MZM arms, with the difference $\tau=(T_p-\Delta t)$ representing a tap delay of an electro-optic FIR equalizer that the equalizing section 221 implements. By suitably selecting the tap delay T, the relative length of the equalizing electrode length a/L, and optionally the gain of the equalizing driver 250, the modulation bandwidth of the EOM 300 may be increased. In some embodiments one or more of these parameters may also be selected so as to at least partially compensate for bandwidth limitations of other elements or systems in the signal path preceding or following the EOM 300.

Although in the illustrated embodiment the EOM 300 includes a single equalizing subsystem 221, in some embodiment additional equalizing electrode subsystems may be added with corresponding delay lines to increase the number of TXPE taps, if desired. Furthermore, although in the illustrated embodiment the equalizing electrode subsystem 221 follows the modulating electrode subsystems 121, in other embodiments it may precede one or more of the modulating subsystems 121, and may even be the first electrode subsystem closest to the MZM input optical port, provided that it is driven with a suitably selected time delay relative to the propagation of the optical modulation signal in the MZM arms. By way of example, in embodiments wherein the first electrode subsystem $121_1$ is driven with an inverted drive signal to provide the optical pre-equalization, the first delay line 140 in the electrical feed circuit 145 may be configured to provide a time delay $T_P$ that is smaller than the time delay Δt that is associated with the light propagation from the equalizing subsystem $121_1$ to the first modulating subsystem $121_2$. In some embodiments of the EOM 300 there may be only a single modulating section 121 that is either followed or preceded by the equalizing section 250, which may be of a smaller length.

Figure 17:
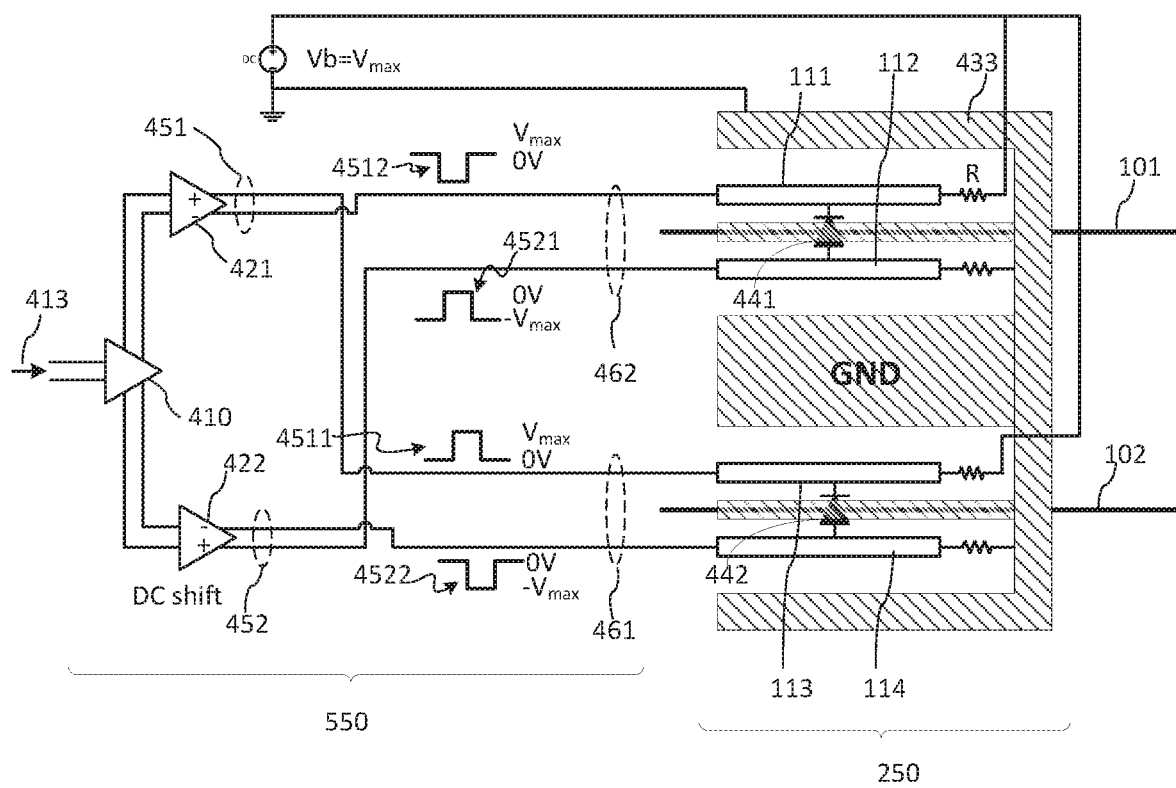
FIG. 17 is a schematic diagram illustrating a plan view of an equalizing section EQ of the EOM of FIG. 16 and a block diagram of its driving circuitry according to an embodiment wherein the modulating sections are driven as illustrated in FIG. 9; the outputs of each of the differential drivers in the EQ driving circuit are inverted as compared to their outputs in the driving circuit of a modulating sections of the same EOM illustrated in FIG. 9.

Referring to FIG. 17, there is schematically illustrated an example electrical drive circuit 550 of an equalizing section 250 of the EOM 300 with p/n junctions based HFPMs, for an embodiment of the EOM 300 in which one or more of the modulating sections 121 are driven as illustrated in FIG. 9.

The equalizing section 250 is similar to the modulating section 121 of FIG. 9, except that it may be of a different length. The electrical drive circuit 550 of the modulating section 250 is substantially identical to the example electrical drive circuit 450 of a modulating section 121 illustrated in FIG. 9, with functionally same elements indicated with same reference numerals, and operates generally as described hereinabove with reference to FIG. 9, except that the outputs of the DC-shifted differential drivers 451 and 452 are inverted, or switched, relative to their outputs in the DDD 450 of a modulating section 121 illustrated in FIG. 9.

Accordingly, for an embodiment of the EOM 300 having a modulating section 121 driven by the DDD 450 of FIG. 9 and an equalizing section 250 driven by the DDD 550 of FIG. 17, in the modulation section 121 light in the first waveguide arm 101 is modulated by the first differential drive signal 461, while in the equalizing section 250 the light in the first waveguide arm 101 is modulated by the second differential drive signal 461. And vice versa, while in the modulation section 121 light in the second waveguide arm 102 is modulated by the second differential drive signal 462, in the equalizing section 250 the light in the second waveguide arm 102 is modulated by the first differential drive signal 462, resulting in a push-pull modulation that is counter-phase to the push-pull modulation in the modulating section 121. Accordingly, the phase modulation of light in the equalizing section 250 is subtracted from the phase modulation of light in the modulating section 121. It will be appreciated that in some embodiments, the gain of the differential drivers 451, 452, and the signal timing in different modulating and equalizing sections of a same EOM may be independently adjustable.

Figure 18:
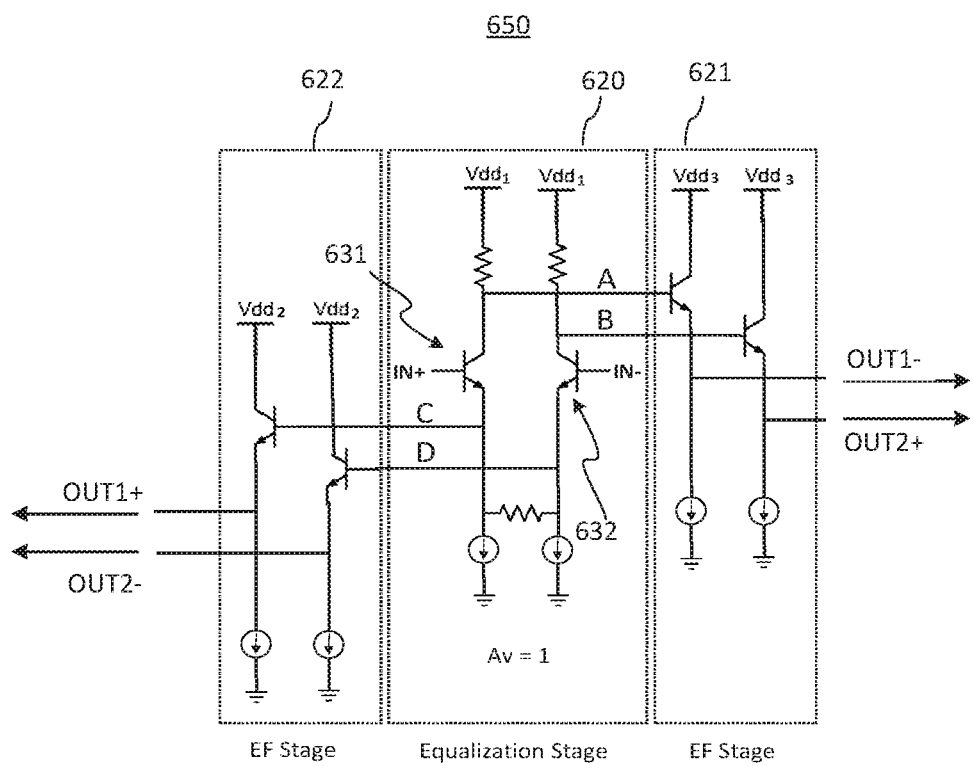
FIG. 18 is a schematic diagram of an example electrical circuit that may be used to implement a dual differential driver with DC shifted differential outputs.

With reference to FIG. 18, there is illustrated an electrical circuit of an example dual-differential driver (DDD) 650, which represents one possible implementation of the DC-coupled electrical drive circuits 450 of FIG. 9 or 550 of FIG. 17. The DDD 650 is configured for DC-coupling to the anode/cathode electrode pairs, and the associated p/n junctions in the first and second waveguide arms, of a modulating section or an equalization section of a sectionalized EOM of the present disclosure. In the illustrated example embodiment the DDD circuit 650 includes a pre-equalization stage or circuit 620 connected between two differential driver circuits or stages 621, 622. The pre-equalization stage or circuit 620 may represent a possible implementation of the common circuit 410 of FIGS. 9 and 17, while the differential driver circuits or stages 621, 622 may be a possible implementation of the differential drivers 421, 422. The three stages 620-622 may have separate supply voltages to reduce the chance of a breakdown or to separately set common-mode voltages. The DDD circuit 650 is similar to the equalizer-driver circuit of FIG. 14 except that it adds the second DD stage 622 at a different common-mode voltage level, as described hereinbelow. The pre-equalization circuit 620 includes a pair of transistors 631, 632 and is configured to provide a high-frequency pre-emphasis to an input differential data signal, with its single-ended components labeled as "IN+" and "IN−", received at the bases of the transistors. The pre-equalization circuit 620, which may be of unity gain, outputs two differential signals at two different common-mode voltage levels: a higher-bias differential signal comprised of two complementary single-ended signals labeled "A" and "B" in the figure, which vary in-phase with the single-ended input data signals IN+ and IN−, respectively, and a lower-bias differential signal comprised of two complementary single-ended signals labeled "C" and "D", with signal C varying in counter phase with IN+ and signal D varying in counter phase with IN−. With the common pre-equalizer stage 620 being of unity gain, Av=1, the AC components of the four outputs A, B, C, and D are equal in amplitude. The common-mode voltage of the higher-bias differential signal (A,B) is defined by the supply voltage Vdd1 and a voltage drop across the load resistors in the collector circuits of the pre-equalizer 620. The common-mode voltage of the lower-bias differential signal (C,D) is defined by the base-emitter voltage drop across the transistors 631, 632 and the common-mode voltage of the input data signal (IN+, IN−). In the context of this specification the common-node voltage of a differential signal may also be referred to as the DC component thereof, in particularly when the common-node voltage is substantially DC, or varies in time much slower than the data rate of the input data signal.

Figure 19:
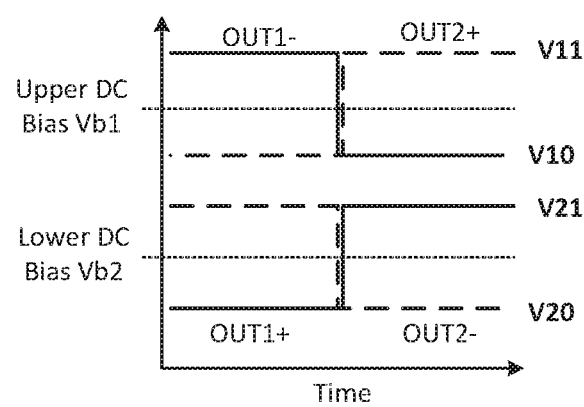
FIG. 19 is a graph illustrating the DC-shifted dual-differential outputs produced by the dual differential drivers of FIGS. 9, 17, and 18.

The two DD circuits 621, 622 are buffer circuits configured as linear amplifiers; in the shown example they are implemented as emitter followers but may also be implemented as collector followers in other embodiments. The first DD circuit 621 converts the complementary single-ended signals (A,B) from the pre-equalizer 620 into two complementary single-ended signals denoted OUT2+ and OUT1−, which alternate about an upper bias voltage level Vb1 between a maximum voltage level V11 and a minimum voltage level V10, as illustrated in FIG. 19. The second DD circuit 622 converts the second pair of complementary single-ended signals (C,D) from the pre-equalizer 620 into two complementary single-ended signals denoted OUT1+ and OUT2−, which alternate about a lower bias voltage level Vb2 between a maximum voltage level V21≤V10 and a minimum voltage level V20, as also illustrated in FIG. 19. The DC bias shift $V_{DCshift}$=(Vb1−Vb2) between the differential drive signals 611, 612 is defined by the supply voltages Vdd1, Vdd2, and Vdd3, by the voltage drops across the load resistors in the pre-equalizer 620, and by the base-emitter voltage drop for the transistors 631, 632

Advantageously, the dual differential drive signals OUT1+, OUT1−, OUT2+ and OUT2− provided by the equalizing DDD circuit 650 can be DC-coupled to the p/n junctions of the waveguide arms of the EOM of the present disclosure. The DC-shifted signals OUT1+ and OUT1− with complementary AC components may be provided as a first differential drive signal for driving one of the two anode/cathode electrode pairs of a modulation or equalization section of an EOM, while the counter-phase DC-shifted signals OUT2+ and OUT2− may be provided as a second differential drive signal for driving the other of the two anode/cathode electrode pairs of the modulation or equalization section of the EOM in counter-phase. By suitably selecting circuit parameters of the DDD 650, such as Vdd1, Vdd2, Vdd3, and values of the load resistors in the pre-equalizer 620, the DC bias shift $V_{DCshift}$ between the differential outputs (OU1+, OU1−) and (OUT2+, OUT2−) of DDD 650 may be selected so as to provide the desired reverse biasing and push-pull modulation of two p/n junctions of a modulating section 121 or an equalizing section 250, when the differential outputs of the DD 621, 622 are cross-coupled to the two p/n junctions, or the corresponding pairs of electrodes.

Referring now also to FIGS. 9 and 17 while continuing to refer to FIGS. 18 and 19, by way of example in one embodiment a first pair of complementary signals (OUT1+, OUT1−) from a first instance of DDD 650 may be DC coupled to the first pair of electrodes 111, 112 of a modulating section 121 to drive its first modulating p/n junction 441 to modulate the first waveguide arm 101, while a second pair of complementary signals (OUT2+, OUT2−) is DC coupled to the second pair of electrodes 113, 114 of the modulating section 121 to drive its second modulating p/n junction 542 to modulate the second waveguide arm 102. In EOM embodiments with the electro-optical equalization, such as those described hereinabove with reference to FIG. 16 or FIG. 17, another instance of the DDD circuit 650 in the EOM may be used to drive an equalizing section 250, with the differential outputs inverted relative to that of the modulating section or sections of the same EOM, so that for example the first pair of complementary signals (OUT1+, OUT1−) is DC coupled to the second pair of electrodes 113, 114 to drive the p/n junction 442 in the second waveguide arm 102, as shown in FIG. 17, while the second pair of complementary signals (OUT2+, OUT2−) is DC coupled to the first pair of electrodes 111, 112 to drive the first p/n junction 441 and modulate the first waveguide arm 101, so that the modulation of each waveguide arm in the equalizing section of the EOM is effectively subtracted from the modulation of the same waveguide arm in the modulating section of the EOM, with a relative time delay selected to counteract the modulation dispersion.

Advantageously, the dual-differential driver 650 providing two differential drive signals with a DC offset between them enables proper reverse biasing of the two p/n junctions of a modulating section of an EOM and driving them in a push-pull manner with a doubled voltage swing without the need for on-chip bypass capacitors, which may otherwise be needed for DC blocking in embodiments where the DC bias is provided to the electrodes separately from the modulating signal. These on-chip bypass capacitors can be relatively large and therefore would increase the chip area and/or add high parasitic capacitance, which in embodiments described hereinabove is advantageously avoided by the use of DC-shifted differential drive signals.

It will be appreciated that the circuitry of the equalizing DDD 650 of FIG. 18 is shown as an example only, and the DDD 650 may include other circuitry implementing additional techniques, such as for example swing-limiting in order to prevent collector-emitter breakdown in the equalization and emitter-follower (EF) stage.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, it will be appreciated that different electro-optic dielectric materials and semiconductor materials other than silicon, including but not limited to compound semiconductor materials of groups commonly referred to as A3B5 and A2B4, such as GaAs, InP, and their alloys and compounds, may be used to fabricate the optical modulator circuits example embodiments of which are described hereinabove. In another example, although example embodiments described hereinabove may have been described primarily with reference to a waveguide modulator device including an MZM, it will be appreciated that principles and device configurations described hereinabove with reference to specific examples may be adopted to other types of optical waveguide modulators.

Furthermore, although some of the embodiment's described hereinabove use depletion-mode p/n junctions formed in semiconductor waveguides, other embodiments may use forward-biased or non-biased p/n junctions, or use electro-optic properties of the waveguide arms material that do not require p/n junctions to modulate the phase or amplitude of propagating light.

Furthermore, although some of the embodiment's described hereinabove use one or more electrical delay lines in the path of the electrical data signal, in other embodiments such electrical delay lines may be supplemented or replaced with optical delay lines disposed in the waveguide arms between at least some of the successive modulating sections; such optical delays may be employed, for example, to synchronize the propagation of the modulated light in the waveguides arms with the delivery of the differential driver signals to the modulating segments.

Furthermore, although the dual-differential driver circuit illustrated in FIGS. 9, 17, and 18, which employs two differential drivers that are DC coupled to both the anodes and the cathodes of the p/n junction phase modulators in the two waveguide arms to convert an input data signal into two output differential drive signals with a DC-shift therebetween, has been described hereinabove with reference to a multi-section EOM such as those illustrated in FIGS. 2, 7, 10, and 16, in other embodiments such a driving circuit may also be advantageously used in non-sectionalized EOM embodiments which employ only a single modulating section, or one modulating section and one equalizing section, and all such embodiments are within the scope of the present disclosure.

Figure 20:
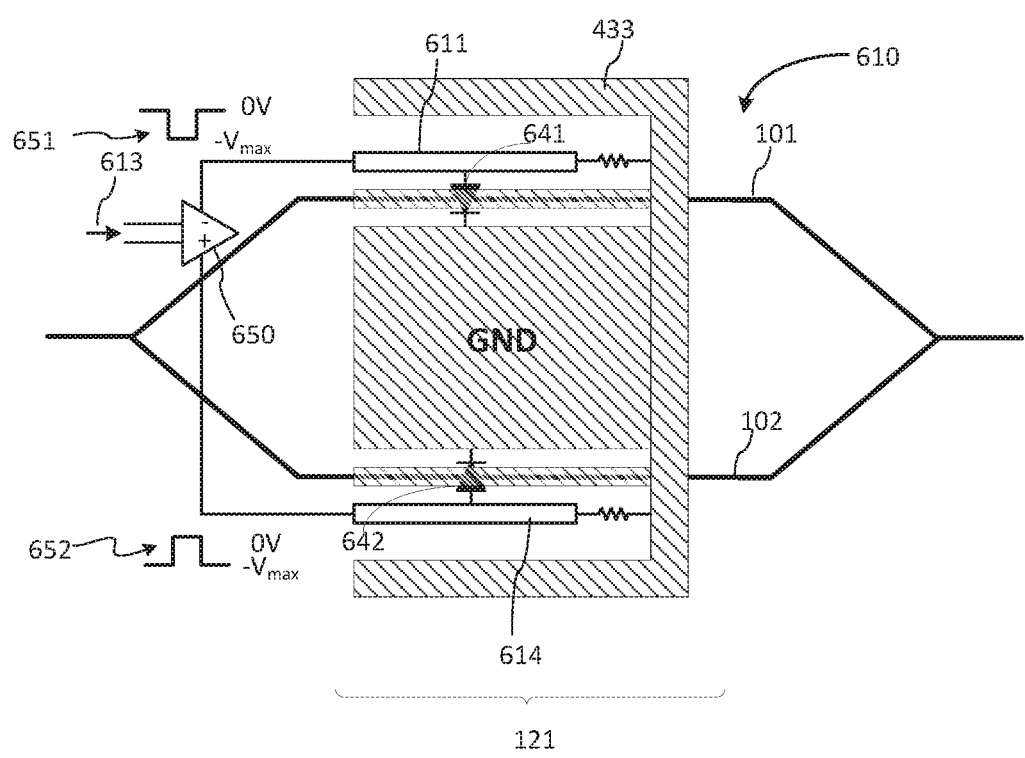
FIG. 20 is a schematic diagram illustrating an EOM with ground-terminated anode electrodes DC coupled to a negative-voltage differential driver and ground-referenced cathode electrodes of the p/n junctions.

Furthermore, FIG. 20 illustrate another example EOM embodiment wherein an MZM 610 is provided with a single modulating section that is driven by a differential driver 650, which complementary single-ended outputs 651, 652 are negatively biased and DC coupled to signal electrodes 611 and 614 that are connected to the anodes of the modulating p/n junctions 640, 642 formed in the waveguide arms 101, 102 of the MZM 610. The cathodes of the modulating p/n junctions 640, 642 may be connected to ground 433. The negative bias of the single-ended drive signals 651, 652 may be effected by using a negative supply voltage Vdd in the differential driver 650, which may be embodied for example as schematically illustrated in FIG. 14. The arrangement wherein the anodes of the modulating p/n junctions are driven by negatively-shifted complementary drive signals while the cathodes are referenced to the ground provides advantages over a scheme wherein the anodes are connected to ground, as it enables to eliminate a bias-T from the driver electronics or the MZM chip. A bias-T, which is commonly used in conventional MZM drivers, may cause signal distortion and/or loss, and is associated with higher cost and size of the modulator chip or module.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the present invention has been particularly shown and described with reference to example embodiments as illustrated in the drawing, it will be understood by one skilled in the art that various changes in detail may be effected therein without departing from the spirit and scope of the invention as defined by the claims.

We claim:

1. A method of modulating input light, the method comprising:
   receiving the input light into an input optical port of an optical modulator comprising a first waveguide arm and a second waveguide arm each extending optically in parallel between the input optical port and an output optical port, for transmitting the input light from the input optical port to the output optical port along two light paths traversing N successive modulator sections of the optical modulator, N≥2;
   converting an input data signal into N differential drive signals, and providing the N differential drive signals separately to each of the N successive modulator sections of the optical modulator; and,
   in each of the N successive modulator sections, applying a corresponding one of the N differential drive signals to the first waveguide arm and, in parallel, to the second waveguide arm
   wherein the applying comprises:
      providing the corresponding one of the N differential drive signals to a first pair of electrodes disposed within one of the N successive modulator sections so as to be electro-optically coupled to the first waveguide arm along a length portion thereof located within said modulator section, and
      providing an inverted version of the corresponding one of the N differential drive signals to a second pair of electrodes disposed within said modulator section so as to be electro-optically coupled to the second waveguide arm along a length portion thereof located within said modulator section,
      so as to effect a dual-differential push-pull modulation of the input light in each of the N successive modulator sections of the optical modulator.

2. The method of claim 1 comprising providing a DC bias to either cathode or anode electrodes in each of the first and second pairs of electrodes.

3. The method of claim 1, wherein each waveguide arm comprises a plurality of semiconductor p/n junctions there along.

4. The method of claim 3, wherein each of the semiconductor p/n junctions is configured to be operated by one of the pairs of electrode.

5. The method of claim 4, wherein:
   the corresponding one of the N differential drive signals comprises a first single-ended signal and a second single-ended signal varying complementary to the first single-ended signal,
   each of the first and second pairs of electrodes comprises a cathode electrode and an anode electrode; and
   wherein the applying comprises applying the first single-ended signal to the cathode electrode of the first pair of electrodes, and applying the second single-ended signal to the anode electrode of the second pair of electrodes.

6. The method of claim 1, wherein each waveguide arm comprises a silicon optical waveguide.

7. The method of claim 3, wherein each waveguide arm comprises a silicon optical waveguide.

8. The method of claim 4, wherein each waveguide arm comprises a silicon optical waveguide.

9. The method of claim 5, wherein each waveguide arm comprises a silicon optical waveguide.

10. The method of claim 3, wherein each of the semiconductor p/n junctions is configured to be operated by one of the pairs of electrode in a carrier depletion mode.

11. An apparatus comprising:
    a waveguide Mach-Zehnder modulator comprising:
       N successive modulator sections, N≥2; and
       a first and a second waveguide arm each extending optically in parallel between an input port and an output port, for transmitting input light from the input port to the output port along two light paths traversing the N successive modulator sections;
       wherein each of the N successive modulator sections comprises a first pair of electrodes electro-optically coupled to the first waveguide arm along a length portion thereof located within said modulator section, and a second pair of electrodes electro-optically coupled to the second waveguide arm along a length portion thereof located within said modulator section; and,
       wherein the first pair of electrodes is configured to receive a first differential drive signal and the second pair of electrodes is configured to receive a second differential drive signal, wherein the second differential drive signal is an inverted version of the first differential drive signal, so as to effect a dual-differential push-pull modulation of the input light in each of the N successive modulator sections.

12. The apparatus of claim 11 wherein the first differential drive signal and the second differential drive signal are provided by an electrical drive circuit.

13. The apparatus of claim 12 further comprising the electrical drive circuit.

14. The apparatus of claim 13, wherein the electrical drive circuit comprises one or more differential drivers.

15. The apparatus of claim 13, wherein the electrical drive circuit comprises at least two differential drivers.

16. The apparatus of claim 13, wherein:
    each of the first pair of electrodes and the second pair of electrodes of at least one of the N successive modulator sections comprises a cathode electrode and an anode electrode; and
    the electrical drive circuit comprises a first differential driver electrically connected to the cathode electrodes of the at least one of the N successive modulator sections, and a second differential driver electrically connected to the anode electrodes of the at least one of the N modulator sections.

17. The apparatus of claim 16 wherein each of the cathode electrode and anode electrode comprises a first end and a second end, wherein the first and second differential drivers are electrically coupled to the first ends of respective cathode or anode electrodes, and wherein the apparatus is configured according to one of the following configurations:
    the second ends of the anode electrodes are grounded and the second ends of the cathode electrodes are connected to a source of DC voltage, or
    the second ends of the cathode electrodes are grounded and the second ends of the anode electrodes are connected to a source of DC voltage.

18. The apparatus of claim 16 wherein each of the first and second waveguide arms comprises a plurality of semiconductor p/n junctions located there along, and wherein each of the semiconductor p/n junctions is configured to be operated by one of the pairs of electrode.

19. The apparatus of claim 11, wherein each waveguide arm comprises a silicon optical waveguide.

20. The apparatus of claim 16, wherein each waveguide arm comprises a silicon optical waveguide.

21. The apparatus of claim 18, wherein each waveguide arm comprises a silicon optical waveguide.

* * * * *